(12) United States Patent
Han et al.

(10) Patent No.: US 9,874,908 B2
(45) Date of Patent: Jan. 23, 2018

(54) ELECTRONIC DEVICES

(71) Applicant: Samsung Electronics Co., Ltd., Suwon-si, Gyeonggi-do (KR)

(72) Inventors: Kwang Soo Han, Uiwang-si (KR); Chung Keun Yoo, Suwon-si (KR); Jin Hyuk Choi, Yongin-si (KR); Byoung Soo Lee, Suwon-si (KR); Jae Woo Lee, Seoul (KR); Ji Hoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/939,427

(22) Filed: Nov. 12, 2015

(65) Prior Publication Data

US 2016/0187938 A1     Jun. 30, 2016

(30) Foreign Application Priority Data

Dec. 24, 2014  (KR) .......................... 10-2014-0188629

(51) Int. Cl.
*G06F 1/16*      (2006.01)
*H04M 1/02*      (2006.01)

(52) U.S. Cl.
CPC .......... *G06F 1/1684* (2013.01); *G06F 1/1615* (2013.01); *H04M 1/0216* (2013.01)

(58) Field of Classification Search
CPC .... G06F 1/1615; G06F 1/1633; H04B 1/3877
See application file for complete search history.

(56) References Cited

U.S. PATENT DOCUMENTS

| | | | | |
|---|---|---|---|---|
| 5,847,698 A | * | 12/1998 | Reavey | G06F 15/0283 345/173 |
| 6,301,098 B1 | * | 10/2001 | Kim | G06F 1/1615 190/100 |
| 7,050,293 B2 | * | 5/2006 | Arbisi | H04M 1/04 361/679.3 |
| 8,310,826 B2 | * | 11/2012 | Wu | G06F 1/1613 206/320 |
| 8,658,263 B2 | | 2/2014 | Kawasumi et al. | |
| 8,988,876 B2 | * | 3/2015 | Corbin | A45C 13/002 361/679.58 |

(Continued)

FOREIGN PATENT DOCUMENTS

| | | |
|---|---|---|
| EP | 1 785 805 A2 | 5/2007 |
| JP | 3810698 B2 | 6/2006 |

(Continued)

*Primary Examiner* — Anthony Q Edwards
(74) *Attorney, Agent, or Firm* — Jefferson IP Law, LLP

(57) ABSTRACT

An electronic device capable of maintaining an angle between two display units at a certain angle, without any hinge structure is provided. The electronic device includes a display unit including a first display unit and a functional unit spaced apart from each other, the functional unit being equipped with an electronic component, a cover unit including a first cover part and a second cover part, to which the first display unit and the functional unit are respectively attached, and a connection unit including a shape-preserving member, which is configured to allow the display unit and the functional unit to be maintained at a certain angle, when an angle between the first cover part and the second cover part is changed by an external force.

16 Claims, 29 Drawing Sheets

(56) References Cited

U.S. PATENT DOCUMENTS

| | | | | |
|---|---|---|---|---|
| 9,013,863 B2* | 4/2015 | Hsu | ................... | H05K 7/1401 |
| | | | | 206/320 |
| D734,761 S * | 7/2015 | Ballou | ..................... | D14/440 |
| 9,086,844 B2* | 7/2015 | Blue | ..................... | G06F 1/1626 |
| 9,172,419 B2 | 10/2015 | Su | ..................... | H04B 1/3888 |
| 2001/0014010 A1* | 8/2001 | Jenks | ..................... | G06F 1/1626 |
| | | | | 361/679.56 |
| 2004/0266496 A1* | 12/2004 | Kauhaniemi | ....... | H04M 1/0214 |
| | | | | 455/575.1 |
| 2007/0097014 A1 | 5/2007 | Solomon et al. | | |
| 2008/0096620 A1* | 4/2008 | Lee | ..................... | G06F 1/1626 |
| | | | | 455/575.8 |
| 2013/0045347 A1 | 2/2013 | Kawasumi et al. | | |
| 2013/0077221 A1* | 3/2013 | Becze | .................... | G06F 3/1438 |
| | | | | 361/679.3 |
| 2013/0083496 A1 | 4/2013 | Franklin et al. | | |
| 2013/0109435 A1* | 5/2013 | McCaughey | ......... | H01Q 1/243 |
| | | | | 455/556.1 |
| 2013/0143014 A1 | 6/2013 | Kawasumi et al. | | |
| 2013/0165190 A1* | 6/2013 | Ko | ............................ | H05K 5/03 |
| | | | | 455/575.8 |
| 2013/0216740 A1 | 8/2013 | Russell-Clarke et al. | | |
| 2014/0205799 A1* | 7/2014 | Lin | ......................... | B29C 65/08 |
| | | | | 428/138 |
| 2015/0098182 A1* | 4/2015 | Liu | ......................... | G06F 1/1681 |
| | | | | 361/679.55 |
| 2015/0116920 A1 | 4/2015 | Franklin et al. | | |
| 2016/0046049 A1* | 2/2016 | Yun | ................... | B29C 45/14778 |
| | | | | 455/575.8 |
| 2016/0142090 A1* | 5/2016 | Yun | ........................ | A45C 11/00 |
| | | | | 455/575.8 |

FOREIGN PATENT DOCUMENTS

| | | |
|---|---|---|
| JP | 2013091729 A | 5/2013 |
| KR | 10-2012-0072627 A | 7/2012 |

* cited by examiner

ELECTRONIC DEVICES

CROSS-REFERENCE TO RELATED APPLICATION(S)

This application claims the benefit under 35 U.S.C. § 119(a) of a Korean patent application filed on Dec. 24, 2014 in the Korean Intellectual Property Office and assigned Serial number 10-2014-0188629, the entire disclosure of which is hereby incorporated by reference.

TECHNICAL FIELD

The present disclosure relates to an electronic device capable of maintaining an angle between two display units at a certain angle, without any hinge structure.

BACKGROUND

An electronic device may include various types of display devices. The use of a display device makes it possible to realize various functions of the electronic device. However, to realize an electronic device with a reduced thickness and weight or an improvement in portability thereof, an appearance and usage pattern of an electronic device becomes simple.

In an electronic device of the related art, a hinge (e.g., biaxial hinges) is used to connect two display units to each other. However, the presence of the hinge leads to an increase in thickness of the electronic device, when the electronic device with the two display units is folded.

In addition, the presence of the hinge has served as one of technical limitations in designing such electronic devices.

Therefore, a need exists for an electronic device capable of maintaining an angle between two display units at a certain angle, without any hinge structure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of maintaining an angle between two display units at a certain angle, without any hinge structure.

In accordance with an aspect of the present disclosure, an electronic device may include a display unit including a first display unit and a functional unit spaced apart from each other, the functional unit being equipped with an electronic component, a cover unit including a first cover part and a second cover part, to which the first display unit and the functional unit are respectively attached, and a connection unit including a shape-preserving member, which is configured to allow the display unit and the functional unit to be maintained at a certain angle, when an angle between the first cover part and the second cover part is changed by an external force.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
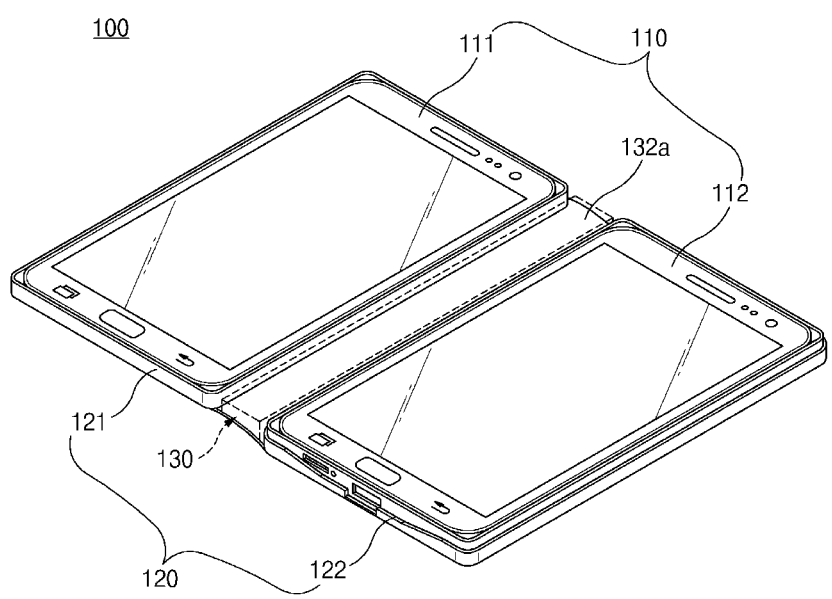
FIGS. 1 and 2 are perspective views illustrating front and rear sides, respectively, of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In various embodiments of the present disclosure, the expressions "have", "may have", "include" and "comprise", or "may include" and "may comprise" used herein indicate existence of corresponding features (e.g., elements, such as numeric values, functions, operations, components, and the like) but do not exclude presence of additional features.

In various embodiments of the present disclosure, the expressions "A or B", "at least one of A or/and B", or "one or more of A or/and B", and the like, used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like, used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to various embodiments of the present disclosure, the electronic devices may be smart home appliances. The smart home appliances may include at least one of, for example, televisions (TVs), digital versatile disc (DVD)

players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to a certain embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to a certain embodiment of the present disclosure, an electronic device may be a flexible electronic. In addition, electronic devices according to various embodiments of the present disclosure are not limited to the above-mentioned devices, and may include new electronic devices according to technology development.

Hereinafter, electronic devices according to an embodiment of the present disclosure will be described with reference to the accompanying drawings. The term "user" used herein may refer to a person who uses an electronic device or may refer to a device (e.g., an artificial electronic device) that uses an electronic device.

Figure 2:
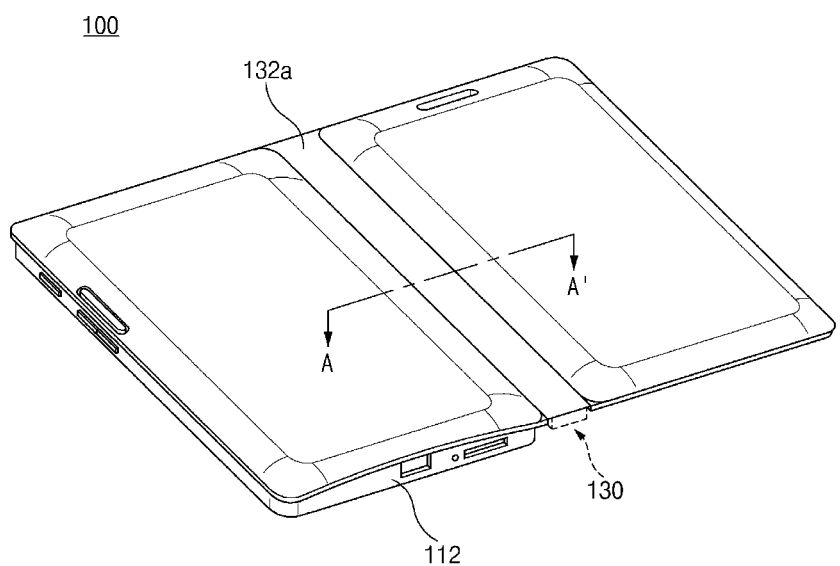

FIGS. 1 and 2 are perspective views illustrating front and rear sides, respectively, of an electronic device according to various embodiments of the present disclosure.

Figure 3:
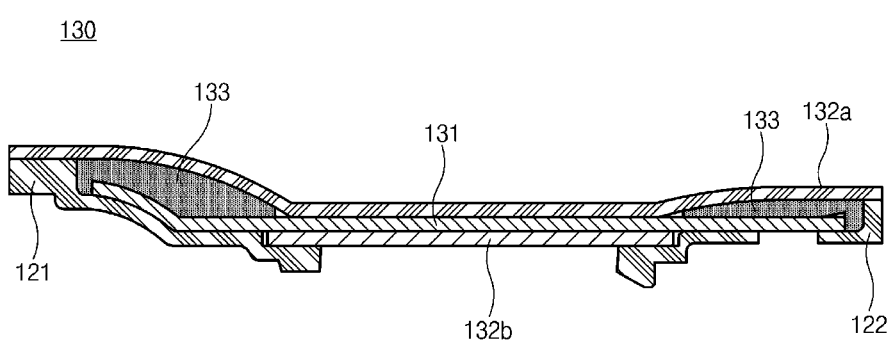
FIG. 3 is a sectional view taken along line A-A' of FIG. 2 according to an embodiment of the present disclosure.

FIG. 3 is a sectional view taken along line A-A' of FIG. 2 according to an embodiment of the present disclosure.

Figure 9:
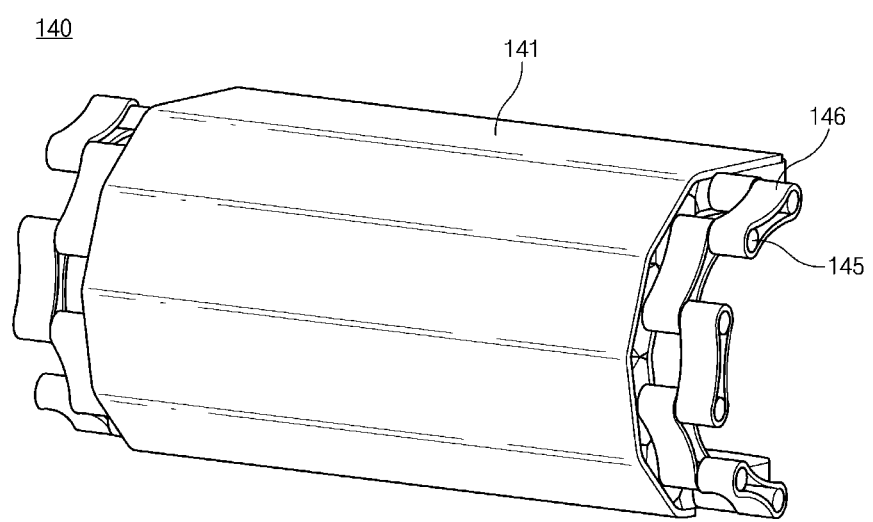
FIG. 9 is a perspective view of a connection unit according to various embodiments of the present disclosure.
Figure 12:
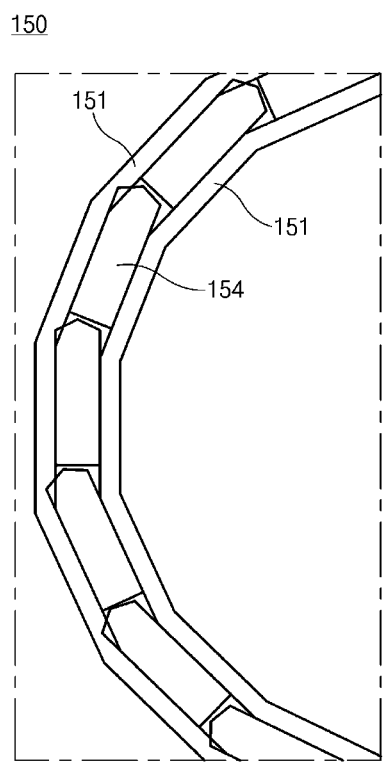
FIG. 12 is a sectional view of a connection unit according to various embodiments of the present disclosure.
Figure 15:
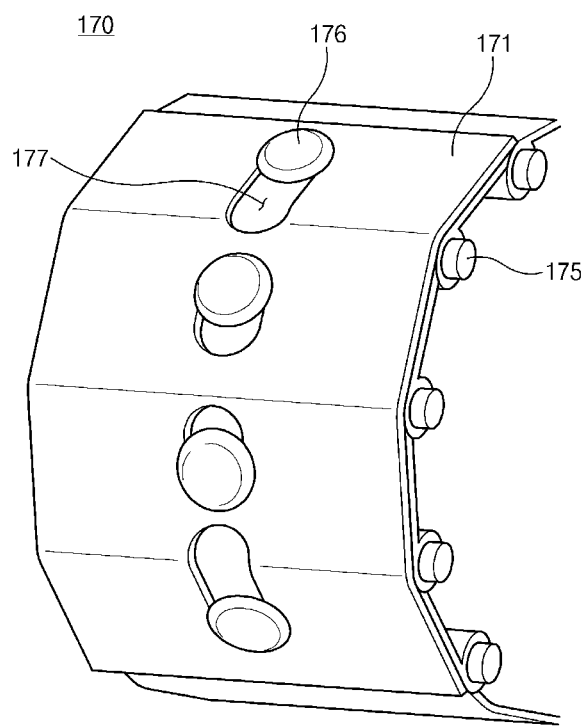
FIG. 15 is a perspective view of a connection unit according to various embodiments of the present disclosure.

Referring to FIGS. 1, 2, and 3, an electronic device 100 according to various embodiments of the present disclosure may include a display unit 110, a cover unit 120, and a connection unit 130. The device 100 may further include a connection unit 140 illustrated in FIG. 9, 150 illustrated in FIG. 12, 170 illustrated in FIG. 15, or 180 illustrated in FIG. 20. The display unit 110 may include a first display unit 111 and a functional unit 112. The cover unit 120 may include a first cover part 121 and a second cover part 122, which are configured to allow the first display unit 111 and the functional unit 112 to be respectively disposed therein. The connection unit 130, 140, 150, 170, or 180 may include a shape-preserving member 131, 141, 151, 171, or 181 connecting the first cover part 121 to the second cover part 122. Here, the shape-preserving member 131, 141, 151, 171, or 181 may be configured to allow an angle between the first display unit 111 and the second the functional unit 112 to be maintained at a certain angle.

In various embodiments of the present disclosure, the functional unit 112 may include at least one of display devices (e.g., a display module, a light-emitting diode (LED) device, and the like), input devices (e.g., a keypad, a touchpad, and the like), sound devices (e.g., a speaker module, a microphone, and the like), power devices (e.g., a wireless charging pad, a solar cell, and the like), sensor devices (e.g., a fingerprint sensor, a gas sensor, and the like) for collecting information on an external environment, or antenna devices (e.g., a near field communication (NFC) device and the like).

For the sake of simplicity, the description that follows will refer to an example of various embodiments in which the functional unit 112 is used as a second display unit, like the first display unit 111. For all that, the present disclosure can also be applied to realize other embodiments of the present disclosure, in which the functional unit 112 serves as or includes one of the input, sound, power, sensor, and antenna devices, and thus, an additional description thereof will be omitted below, for convenience in description.

In various embodiments of the present disclosure, the first display unit 111 and the second display unit 112 may serve as individual display devices, on which different pieces of information can be independently displayed. In certain embodiments of the present disclosure, the first display unit 111 and the second display unit 112 may be connected to each other via a circuit board P and may be operated in an interlinked and integrated manner.

In various embodiments of the present disclosure, the electronic device 100 may be a personal electronic device (e.g., a laptop computer), and in this case, the first display unit 111 may serve as a monitor of the laptop computer and the second display unit 112 may serve as a main computer body provided with a keyboard.

In various embodiments of the present disclosure, the cover unit 120 may include the first cover part 121 provided with the first display unit 111 and the second cover part 122 provided with the second cover part 122. In various embodiments of the present disclosure, the cover unit 120 and the display unit 110 may be separately manufactured, and then, the display unit 110 may be attached to the cover unit 120.

Figure 4:
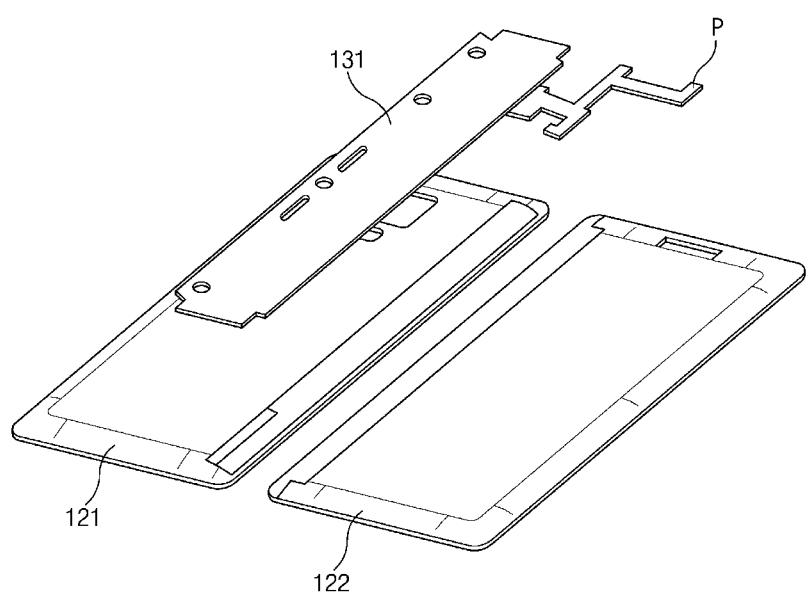
FIG. 4 is a plane view illustrating a first inner connection member, a circuit board, and a shape-preserving member, which are joined to each other, according to various embodiments of the present disclosure.

FIG. 4 is a plane view illustrating a first inner connection member, a circuit board, and a shape-preserving member, which are joined to each other, according to various embodiments of the present disclosure.

Figure 5:
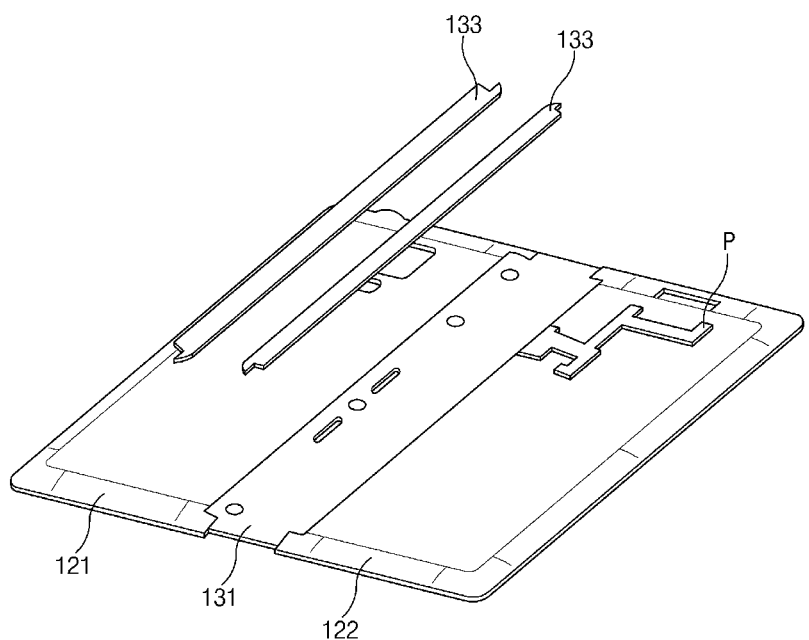
FIGS. 5, 6, and 7 are perspective views sequentially illustrating a process of manufacturing an electronic device according to various embodiments of the present disclosure.
Figure 6:
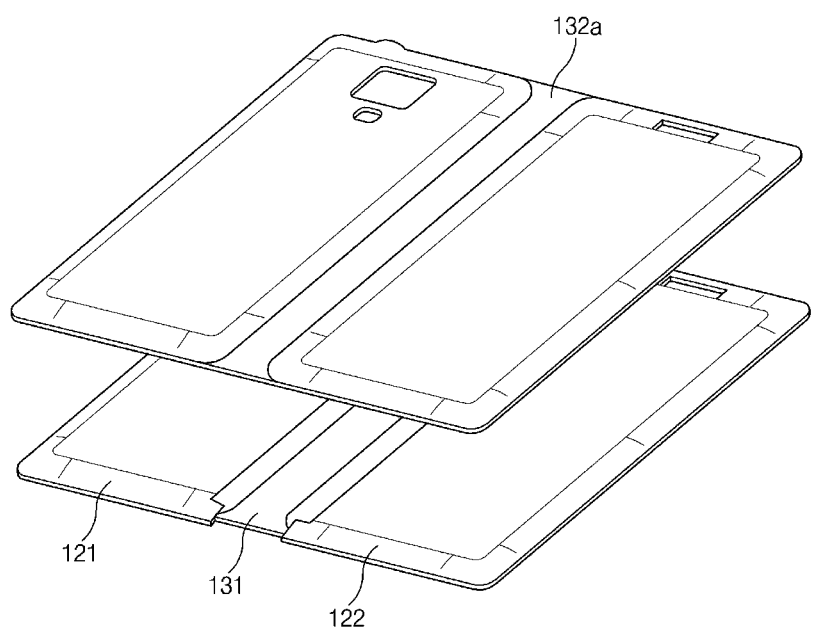
Figure 7:
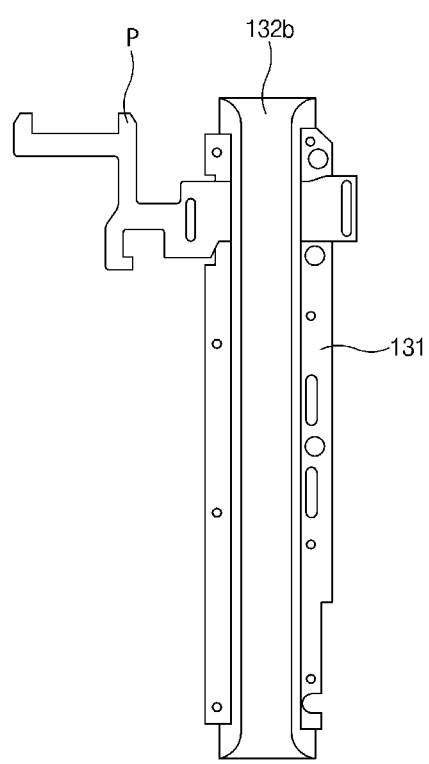

FIGS. 5, 6, and 7 are perspective views sequentially illustrating a process of manufacturing an electronic device according to various embodiments of the present disclosure.

Referring to FIGS. 4, 5, and 6, the cover unit 120 may be prepared as a component independent of the display unit 110 and may be formed of at least one of plastic or textile materials, but various embodiments of the present disclosure may not be limited thereto. For example, if the material for the cover unit 120 allows for attachment with the display unit 110, the material for the cover unit 120 can be variously changed.

In various embodiments of the present disclosure, the cover unit 120 may have a partition wall, which is formed along an outer circumference edge of a bottom surface thereof, and in this case, the attachment between the display unit 110 and the cover unit 120 may be achieved by inserting the display unit 110 in a space defined by the partition wall. In certain embodiments of the present disclosure, the cover unit 120 may be provided in the form of a plate (e.g., without the partition wall), and in this case, the attachment between the display unit 110 and the cover unit 120 may be achieved by adhering the display unit 110 to the cover unit 120.

Accordingly, in the case where the first cover part 121 and the second cover part 122 are connected to each other through the connection unit 130, 140, 150, 170, or 180, the first display unit 111 may be connected to the second display unit 112.

In various embodiments of the present disclosure, the connection unit 130, 140, 150, 170, or 180 may include the shape-preserving member 131, 141, 151, 171, or 181, which is configured to allow an angle between the first display unit 111 and the second display unit 112 to be maintained at a certain angle, when an external force is exerted on the first display unit 111 and the second display unit 112 to change a relative position (e.g., rotation angle) of the first display unit 111 with respect to the second display unit 112.

In various embodiments of the present disclosure, although the first display unit 111 and the second display unit 112 may be units different from each other, each of them is not used to specify a specific display. Furthermore, it is possible to apply technical issues associated with the first display unit 111 to the second display unit 112 or vice versa, but a description thereof is omitted to avoid redundancy.

Meanwhile, spatially relative terms, such as "below", "lower", "above", "upper", "top", "bottom" and the like, may be used herein for ease of description to describe an element and/or a feature's relationship to another element(s) and/or feature(s) as illustrated in the figures. It will be understood that the spatially relative terms are intended to encompass different orientations of the device in use or operation in addition to the orientation depicted in the figures.

In various embodiments of the present disclosure, various materials can be used for the shape-preserving member 131, 141, 151, 171, or 181, as long as such materials are selected to allow the shape-preserving member 131, 141, 151, 171, or 181 to be deformed by an external force and be maintained in the deformed state when there is no external force.

In various embodiments of the present disclosure, the shape-preserving member 131, 141, 151, 171, or 181 may be formed of or include ethylene homopolymers or ethylene•α-olefin copolymers, whose density is higher than 950 kg/m3, Mw/Mn ranges from 5 to 15, content of α-olefin with a carbon number of 3-6 is less than 2 wt %, where Mw and Mn represent a weight-average molecular weight and a number-average molecular weight, respectively.

In various embodiments of the present disclosure, the shape-preserving member 131, 141, 151, 171, or 181 may be manufactured by preparing a circular film containing ethylene homopolymers, whose density is higher than 940 kg/m3 and Mw/Mn ranges from 5 to 20, or ethylene-α-olefin copolymers, whose content of α-olefin with a carbon number of 3-6 is less than 2 wt %, and then by stretching or drawing the circular film at a draw ratio of 10-30.

In various embodiments of the present disclosure, the shape-preserving member 131, 141, 151, 171, or 181 may include at least one substrate layer containing at least one of ethylene polymers, whose density is higher than 900 kg/m3 and the ratio of Mw/Mn ranges from 5 to 20, and at least one soft layer containing a polymeric material. Here, the ethylene polymers may be ethylene homopolymers or ethylene-α-olefin copolymers, whose content of α-olefin with a carbon number of 3-6 is less than 2 wt %, and the polymeric materials may be selected to have a melting point, Tm2, that is lower than a melting point, Tm1, of the ethylene polymer, to have a tensile modulus of 10-50 GPa, and to have a restoration angle of 65° or less under a 180°-bending test.

Hereinafter, a connection unit, in which a shape-preserving member according to various embodiments of the present disclosure provided, will be described.

First Embodiment

Referring to FIGS. 1, 2, and 3, the connection unit 130 according to various embodiments of the present disclosure may be provided between the first display unit 111 and the second display unit 112. The connection unit 130 may further include a first connection member 132, which is provided to cover the shape-preserving member 131 and connect the first cover part 121 to the second cover part 122, in addition to the shape-preserving member 131.

In various embodiments of the present disclosure, the first connection member 132 may include a first outer connection member 132a, which is provided to cover outer surfaces of the first cover part 121 and the second cover part 122 and to connect the first cover part 121 to the second cover part 122, and a first inner connection member 132b, which is provided opposite to the first outer connection member 132a (i.e., on inner surfaces of the first cover part 121 and the second cover part 122, to which the display unit 110 will be attached) to connect the first cover part 121 to the second cover part 122.

In various embodiments of the present disclosure, as shown in FIGS. 3 to 6, the shape-preserving member 131 may be provided to extend parallel to a longitudinal direction of the first cover part 121 and the second cover part 122 and to connect the first cover part 121 to the second cover part 122. In certain embodiments of the present disclosure, the shape-preserving member 131 may include a plurality of parts, which are spaced apart from each other, and each of which is used to connect the first cover part 121 to the second cover part 122.

In various embodiments of the present disclosure, the first outer connection member 132a may be formed of various materials (e.g., synthetic leather, leather, fibers, and the like). As shown in FIGS. 4 and 5, the first outer connection member 132a may be formed to cover all of the bottom surfaces of the first cover part 121 and the second cover part 122 and thereby to connect the first cover part 121 to the second cover part 122. In certain embodiments of the present disclosure, the first outer connection member 132a may be formed to partially cover the first cover part 121 and the second cover part 122, and even in this case, the first cover part 121 and the second cover part 122 may be connected to each other through the first outer connection member 132a.

In various embodiments of the present disclosure, the first inner connection member 132b may be provided opposite to the first outer connection member 132a to be in contact with a side surface of the shape-preserving member 121 and cover the shape-preserving member 131.

Referring to FIG. 3, the first outer connection member 132a, the shape-preserving member 131, and the first inner connection member 132b may be sequentially stacked, in a downward direction of FIG. 3, to connect the first cover part 121 to the second cover part 122.

In various embodiments of the present disclosure, the electronic device 100 may include a circuit board P, which is interposed between the shape-preserving member 131 and the first inner connection member 132b to electrically connect the first display unit 111 to the second display unit 112.

In the case where the circuit board P is interposed between the first inner connection member 132b and the shape-preserving member 131, the first inner connection member 132b, the circuit board P, and the shape-preserving member 131 may constitute a sequentially-stacked single component.

Referring to FIGS. 3 and 6, the connection unit 130 according to various embodiments of the present disclosure may further include an insertion member 133 interposed between the first outer connection member 132a and the shape-preserving member 131.

In the case where the first outer connection member 132a is designed to have a curved section, the insertion member 133 may be formed to have an outer circumference surface corresponding to that of the first outer connection member 132a. In this case, the insertion member 133 inserted between the first outer connection member 132a and the shape-preserving member 131 may make it possible for the outer circumference surface of the first outer connection member 132a to have a certain shape.

Hereinafter, a method of connecting the first cover part 121 and the second cover part 122 to each other using the connection unit 130 will be described below.

Referring to FIGS. 5, 6, and 7, the first cover part 121 and the second cover part 122 may be disposed spaced apart from each other (e.g., by a uniform interval in a length direction thereof, as shown in FIG. 5), and then, the component described with reference to FIG. 4 (i.e., including the first inner connection member 132b, the circuit board P, and the shape-preserving member 131) may be attached to opposite edges of the first cover part 121 and the second cover part 122 to connect the first cover part 121 to the second cover part 122.

Thereafter, the insertion member 133 according to various embodiments of the present disclosure may be attached to each of opposite longitudinal edge regions of the shape-preserving member 131, and the first outer connection member 132a may be provided to cover a top surface of the resulting structure provided with the insertion member 133. The first outer connection member 132a may be attached to the top surfaces of the first cover part 121 and the second cover part 122 to connect the first cover part 121 to the second cover part 122.

As a result, the first outer connection member 132a, the insertion member 133, the shape-preserving member 131, and the first inner connection member 132b may be sequentially stacked and coupled to each other to form a structure connecting the first cover part 121 to the second cover part 122, as shown in FIG. 3.

In various embodiments of the present disclosure, the connection unit 130 may include the shape-preserving member 131, and the presence of the shape-preserving member 131 may make it possible to maintain the first display unit 111 at a desired position relative to the second display unit 112. For example, when one of the first display unit 111 and the second display unit 112 is rotated by an external force, the shape-preserving member 131 may allow the first display unit 111 and the second display unit 112, which are respectively attached to the first cover part 121 and the second cover part 122, to face each other or form a certain angle.

Figure 8:
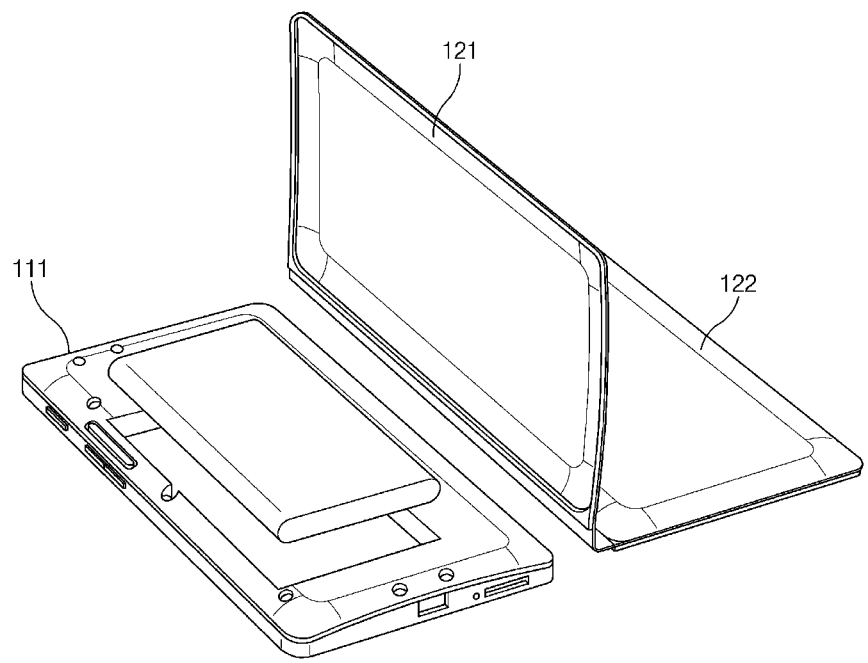
FIG. 8 is a perspective view illustrating an electronic device, in which a cover unit attachable/detachable to/from a display unit is provided, according to various embodiments of the present disclosure.

FIG. 8 is a perspective view illustrating an electronic device, in which a cover unit attachable/detachable to/from a display unit is provided, according to various embodiments of the present disclosure.

Referring to FIG. 8, the electronic device 100 according to various embodiments of the present disclosure may be configured to allow the cover unit 120 and the display unit 110 to be attached/detached to/from each other. Accordingly, in the case where the cover unit 120 is detached from the display unit 110, it is possible to replace a battery, which is attached to the first display unit 111 or the second display unit 112, with another battery.

Second Embodiment

FIG. 9 is a perspective view of a connection unit according to various embodiments of the present disclosure.

Figure 10:
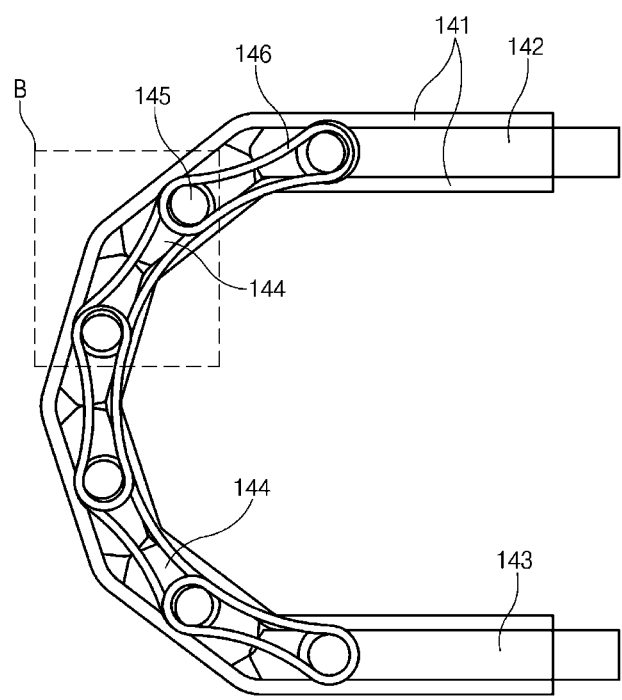
FIG. 10 is a side view of a connection unit according to various embodiments of the present disclosure.

FIG. 10 is a side view of a connection unit according to various embodiments of the present disclosure.

Figure 11:
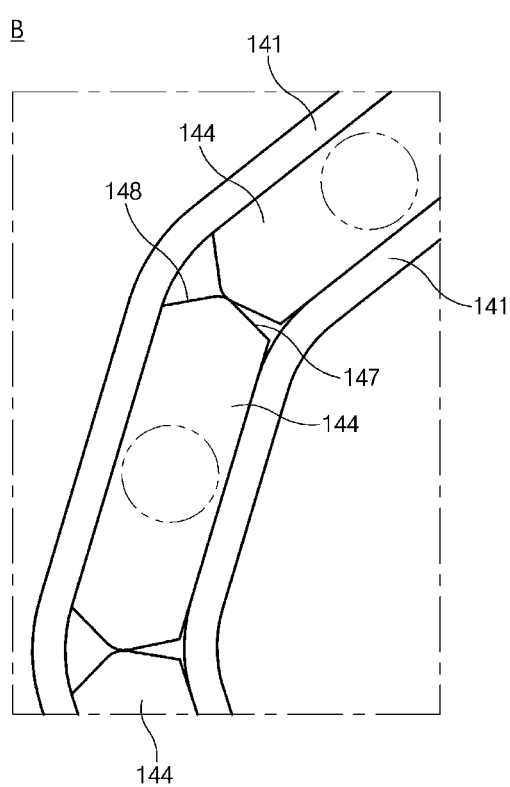
FIG. 11 is an enlarged view illustrating a portion of a side view of a connection unit according to an embodiment of the present disclosure.

FIG. 11 is an enlarged view illustrating a portion of a side view of a connection unit according to an embodiment of the present disclosure.

Referring to FIGS. 9, 10, and 11, in other embodiments of the present disclosure, a connection unit 140 may include a second connection member 142, which is connected to the first cover part 121 and has an end with a curved or inclined surface, a third connection member 143, which is connected to the second cover part 122 and has an end with a curved or inclined surface, and a fourth connection member 144, which has opposite ends with curved or inclined surfaces and is in contact with the second connection member 142 or the third connection member 143 having the curved or inclined surface.

In various embodiments of the present disclosure, the shape-preserving member 141 may be provided in the form of a plate or board and may be disposed on top and bottom surfaces of the second connection member 142 to the fourth connection member 144. Accordingly, the second connection member 142 to the fourth connection member 144 may be inserted in the shape-preserving member 141.

Figure 18:
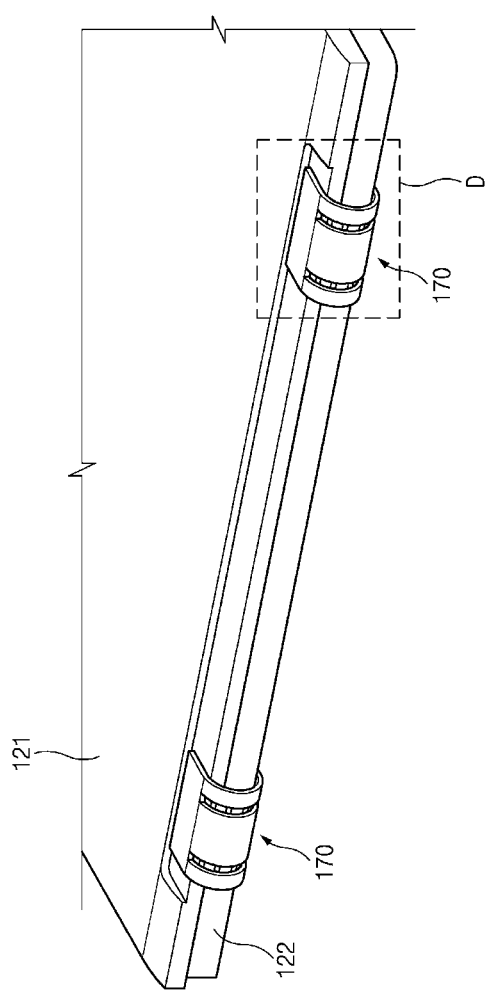
FIG. 18 is a perspective view of an electronic device including a connection unit, according to various embodiments of the present disclosure.

In various embodiments of the present disclosure, the connection unit 140 may be a single component having a length corresponding longitudinal lengths of the first cover part 121 and the second cover part 122 and connecting the first cover part 121 to the second cover part 122, as illustrated in FIG. 1, or may include a plurality of units, which are spaced apart from each other and each of which connects the first cover part 121 to the second cover part 122, as illustrated in FIG. 18.

In various embodiments of the present disclosure, the second connection member 142 may include an end portion, which is connected to the first cover part 121, and an opposite end portion, which is disposed to be in contact with the fourth connection member 144. The third connection member 143 may include an end portion connected to the second cover part 122 and an opposite end portion connected to the fourth connection member 144.

Accordingly, the fourth connection member 144 may be disposed between the second connection member 142 and the third connection member 143. In addition, since the shape-preserving member 141 shaped like a plate or board is attached to the top and bottom surfaces of the second connection member 142 to the fourth connection member 144, the fourth connection member 144 may be disposed between the second connection member 142 and the third connection member 143 and may be inserted in the shape-preserving member 141. In various embodiments of the present disclosure, the connection unit 140 may include a plurality of the fourth connection members 144, each of which is disposed to satisfy the afore-described position requirement.

In the case where the plurality of the fourth connection members 144 are inserted in the shape-preserving member 141, rotation axes 145 may be inserted into the second connection member 142 to the fourth connection member 144, respectively, to prevent the fourth connection members 144 from being separated from each other. In certain embodiments of the present disclosure, a joint member 146 may be provided to connect an adjacent pair of the rotation axes 145 to each other.

Referring to FIGS. 10 and 11, each of the end portion of the second connection member 142, both end portions of the fourth connection member 144, and the end portion of the third connection member 143 may be formed to have upward and downward inclined surfaces or to have a curved surface (e.g., shaped like a semicircle) (not shown).

Accordingly, there may be gaps between the second connection member 142 and the fourth connection member 144, between the third connection member 143 and the fourth connection member 144, and between the third connection members 144 (when a plurality of the fourth connection members 144 are provided), although they are in contact with or connected to each other.

In various embodiments of the present disclosure, in the case of the second connection member 142 and the fourth connection member 144 in contact with each other, each of the end portions of the second connection member 142 and the fourth connection member 144 may have an upper inclined surface 147 and a lower inclined surface 148 defining a protruding portion, and the protruding portions of the second and fourth connection members 142 and 144 may be in contact with each other.

In various embodiments of the present disclosure, in the case where an external force is exerted on the second connection member 142 in a specific direction, the second connection member 142 may rotate about the protruding portion of the fourth connection member 144 while maintaining the contacted state between the protruding portions of the second and fourth connection members 142 and 144. The protruding portion of the opposite end portion of the fourth connection member 144 may be in contact with the protruding portion of the third connection member 143 or the protruding portion of another one of the fourth connection members 144 (when a plurality of the fourth connection members 144 are provided). Accordingly, the third connection member 143 in contact with the fourth connection member 144 may also rotate about the protruding portion of the opposite end portion of the fourth connection member 144. In other words, according to various embodiments of the present disclosure, the second connection members 142 to the fourth connection member 144 may be allowed to independently rotate about respective pivot points, at which their end portions meet or are in contact with each other.

According to various embodiments of the present disclosure, the shape-preserving member 141 may be attached to the top and bottom surfaces of the second connection member 142 to the fourth connection member 144, the rotation axes 145 may be inserted in the second connection member 142 to the fourth connection member 144, respectively, and the rotation axes 145 may be connected to each other by the joint members 146. Accordingly, it is possible to independently rotate the second connection member 142 to the fourth connection member 144 about the respective pivot points therebetween, while preventing the fourth connection member 144 from being deviated from its normal position. This makes it possible for a user to control a folding angle of the electronic device 100 to a desired angle.

In other words, by rotating the second connection member 142 or the fourth connection member 144 in a specific direction, it is possible to maintain an angle between the second connection member 142 and the fourth connection member 144 at a certain angle. Furthermore, in the case where a plurality of the fourth connection members 144 are provided, there may be a plurality of pivot points in the shape-preserving member 141, and this makes it possible to change a position or orientation of the second connection member 142 and/or the fourth connection member 144 in various ways.

Furthermore, the second connection member 142 may be connected to the first cover part 121, the third connection member 143 may be connected to the second cover part 122, the first display unit 111 may be attached to the first cover part 121, the second display unit 112 may be attached to the second cover part 122, and as a result, it is possible to maintain an angle between the first display unit 111 and the second display unit 112 at a user's desired angle.

Third Embodiment

FIG. 12 is a sectional view of a connection unit according to various embodiments of the present disclosure.

Figure 13:
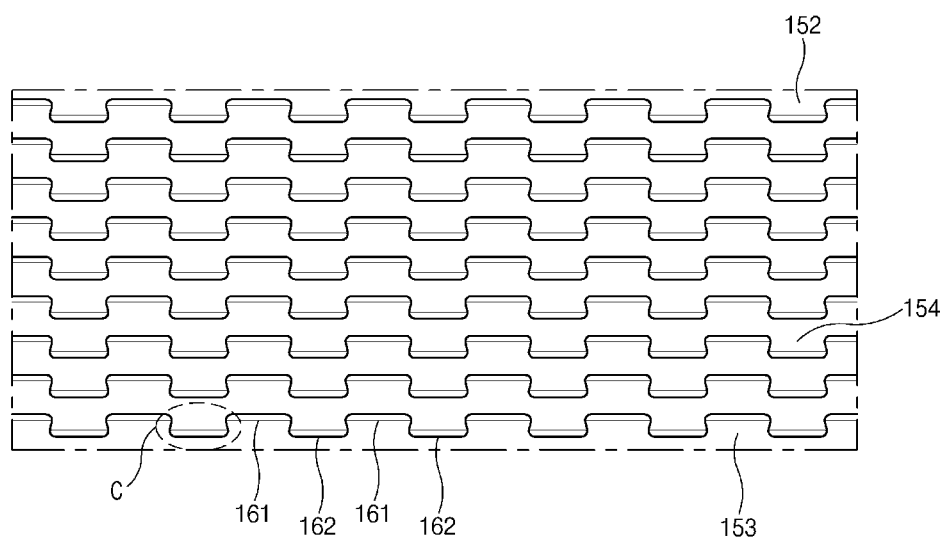
FIG. 13 is a front view of a connection unit according to various embodiments of the present disclosure.

FIG. 13 is a front view of a connection unit according to various embodiments of the present disclosure.

Figure 14:
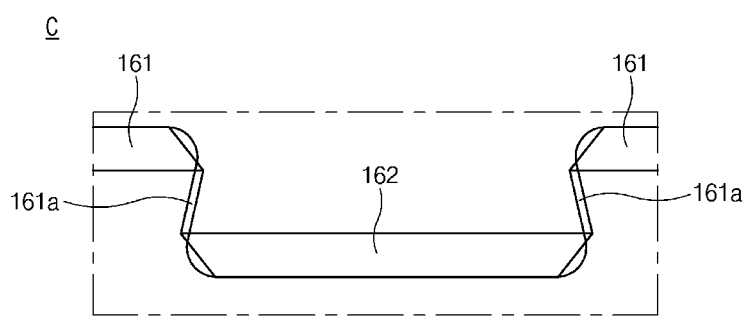
FIG. 14 is an enlarged view illustrating a portion of a side view of a connection unit according to an embodiment of the present disclosure.

FIG. 14 is an enlarged view illustrating a portion of a side view of a connection unit according to an embodiment of the present disclosure.

Referring to FIGS. 12, 13, and 14, a connection unit 150 may include a second connection member 152 connected to the first cover part 121, a third connection member 153 connected to the second cover part 122, and a fourth connection member 154 disposed between the second connection member 152 and the third connection member 153. The second connection member 152 to the fourth connection member 154 may be provided to have protruding portions 161, which are arranged in a longitudinal direction thereof and have a laterally protruding shape, and recessed regions 162, which are formed between the protruding portions 161. Each of the protruding portions 161 may be interposed between an adjacent pair of the recessed regions 162. The shape-preserving member 151 may be provided in the form of a plate or board. The shape-preserving member 151 may be provided on top and bottom surfaces of the second connection member 152 to the fourth connection member 154. Accordingly, the second connection member 152 to the fourth connection member 154 may be inserted in the shape-preserving member 151.

According to the third embodiment of the present disclosure, each of the second, third, and fourth connection members 152, 153, and 154 may have the protruding portions 161 and the recessed regions 162, which are alternatingly arranged in the longitudinal direction thereof, as shown in FIG. 13, and thus, the third embodiment of the present disclosure may differ from the second embodiment of the present disclosure in which the rotation axes are respectively inserted in the second connection member 152 to the fourth connection member 154 and are connected to each other by the joint member to prevent the third connection member 153 from being deviated from its normal position. More particularly, each of the second and third connection members 152 and 153 may have the protruding portions 161 and the recessed regions 162, which are adjacent to or in contact with the fourth connection member 154 in a vertical direction. In the case where the connection unit 150 includes a plurality of the fourth connection members 154, each of the fourth connection members 154 may also have the protruding portions 161 and the recessed regions 162, which are adjacent to or in contact with others in a vertical direction. In each of the second, third, and fourth connection members 152, 153, and 154, each of the recessed regions 162 may be formed between an adjacent pair of the protruding portions 161, and the protruding portions 161 and the recessed regions 162 may be alternatingly arranged.

Since the protruding portion 161 of each of the connection members may be inserted between the recessed regions 162 of other connection members vertically adjacent thereto, there may be friction between both sides 161*a* of the protruding portion 161 and the recessed region 162. Due to the friction, it is possible to maintain the second and fourth connection members 152 and 154, the third and fourth connection members 153 and 154, and adjacent ones of the fourth connection members 154 (when a plurality of the fourth connection members 154 are provided) in a coupled state, without the use of any rotation axis.

In the third embodiment of the present disclosure, the operation states of the second connection member 152 to the fourth connection member 154 may be the same, and thus, an overlapping description will be omitted.

Fourth Embodiment

FIG. 15 is a perspective view of a connection unit according to various embodiments of the present disclosure.

Figure 16:
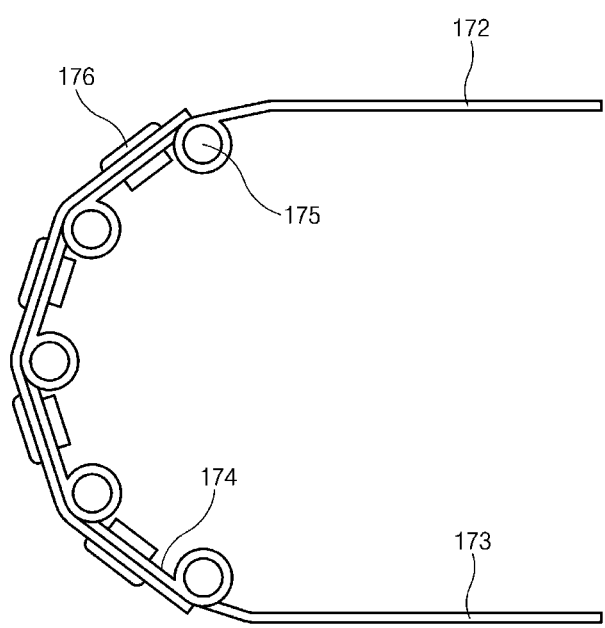
FIG. 16 is a side view of a connection unit according to various embodiments of the present disclosure.

FIG. 16 is a side view of a connection unit according to various embodiments of the present disclosure.

Figure 17:
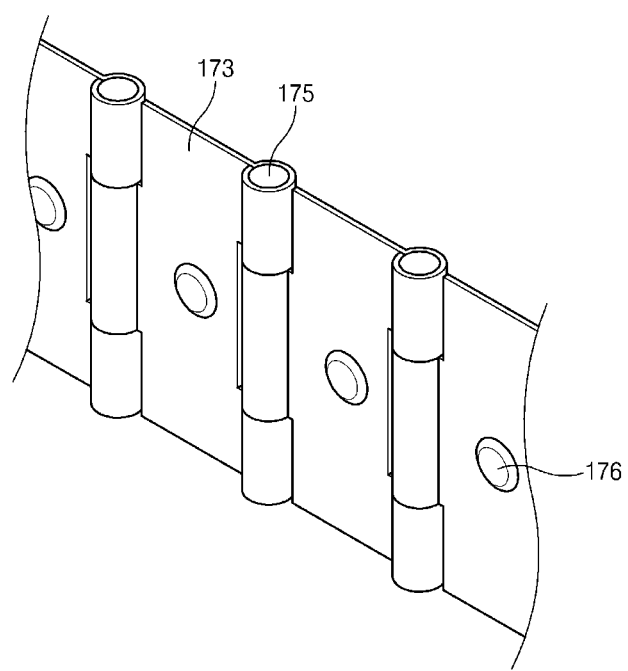
FIG. 17 is a perspective view illustrating connection members, which are connected to each other, according to various embodiments of the present disclosure.

FIG. 17 is a perspective view illustrating connection members, which are connected to each other, according to various embodiments of the present disclosure.

FIG. 18 is a perspective view of an electronic device including a connection unit, according to various embodiments of the present disclosure.

Figure 19:
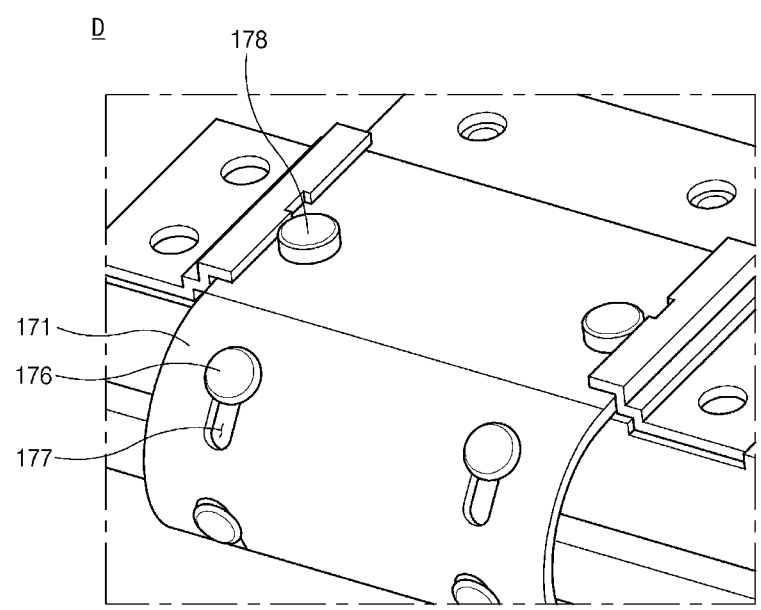
FIG. 19 is an enlarged view illustrating a portion of a side view of a connection unit according to an embodiment of the present disclosure.

FIG. 19 is an enlarged view illustrating a portion of a side view of a connection unit according to an embodiment of the present disclosure.

Referring to FIGS. 15, 16, 17, 18, and 19, a connection unit 170 may include a second connection member 172 connected to the first cover part 121, a third connection member 173 connected to the second cover part 122, and a fourth connection member 174 disposed between the second connection member 172 and the third connection member 173. The shape-preserving member 171 may have at least one hole 177 formed at a side thereof in a width direction and may be attached to a surface of the fourth connection member 174. The fourth connection member 174 may be coupled to the second connection member 172 and the third connection member 173 to have rotatable both ends. A protrusion 176 may be inserted in the hole 177.

In various embodiments of the present disclosure, the connection unit 170 may be configured in such a way that the second and fourth connection members 172 and 174, the third and fourth connection members 173 and 174, and adjacent ones of the fourth connection members 174 (when a plurality of the fourth connection members 154 are provided) are rotatable with respect to each other.

Referring to FIG. 18, the second connection member 172 to the fourth connection member 174 may be connected to each other by a hinge structure, and thus, each of them can be freely rotated about a rotation axis 175 connecting them. In addition, the second connection member 172 to the fourth connection member 174 may be connected by the protrusion 176, which is inserted in the hole 177 of the shape-preserving member 171.

The shape-preserving member 171 may be attached to top surfaces of the second connection member 172 to the fourth connection member 174 and may have the hole 177, in which the protrusion 176 is inserted. In some embodiments of the present disclosure, a plurality of the holes 177 may be formed along a direction, in which the second connection member 172 to the fourth connection member 174 are connected, and a portion of the protrusion 176 inserted in the hole 177 may have a width greater than that of the hole 177, and this makes it possible to prevent the protrusion 176 inserted in the hole 177 from being taken off from the hole 177.

Accordingly, in the case where the second connection member 172 to the fourth connection member 174 of the connection unit 170 are connected to each other using only the hinge structure, it is impossible to maintain certain positions of the second connection member 172 or the fourth connection member 174. By contrast, in the case of the connection unit 170 according to various embodiments of the present disclosure, it is possible to maintain an angle between the second connection member 172 to the fourth connection member 174 at a user's desired angle, because the shape-preserving member 171 is attached to the second connection member 172 to the fourth connection member 174 and the protrusion 176 is inserted in the hole 177.

In other words, if the second connection member 172 or the third connection member 173 is rotated in a specific direction, the second connection member 172 to the fourth connection member 174 may rotate about the rotation axis 175. However, if an external force vanishes, the second connection member 172 to the fourth connection member 174 may be located at positions determined by the shape-preserving member 171, and thus, an angle between the first display unit 111 and the second display unit 112 can be maintained at a certain angle, similar to the third embodiment of the present disclosure described above.

Referring to FIG. 18, a plurality of the connection units 170 may be provided spaced apart from each other to connect the first cover part 121 to the second cover part 122.

Referring to FIG. 19, at least one protruding connector 178 may be provided to connect the first cover part 121 or the second cover part 122 to the second connection member 172 or the third connection member 173, and the second connection member 172 and the third connection member 173 may be provided to have the hole 177, allowing the protruding connector 178 to be inserted therein. Accordingly, by inserting the protruding connector 178 in the hole 177, it is possible to fixedly attach the second connection member 172 and the third connection member 173 to the first cover part 121 and the second cover part 122, respectively.

Fifth Embodiment

Figure 20:
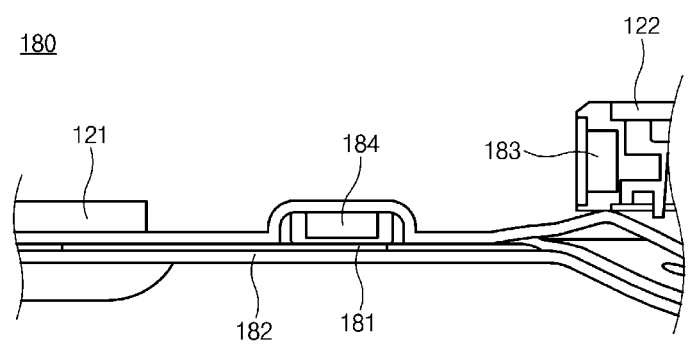
FIG. 20 is a sectional view of an electronic device according to various embodiments of the present disclosure.

FIG. 20 is a sectional view of an electronic device according to various embodiments of the present disclosure.

Figure 21:
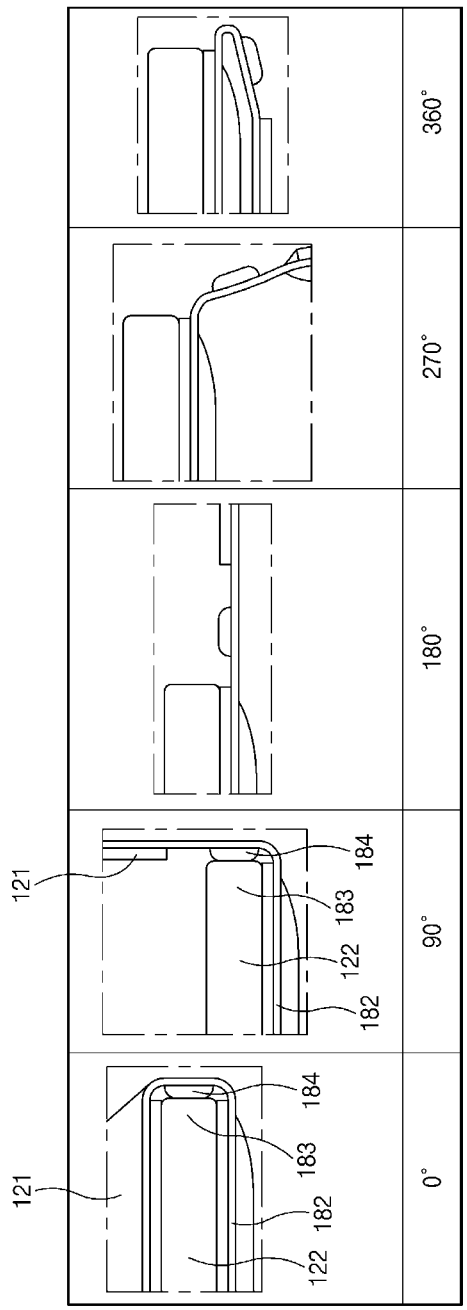
FIG. 21 is a diagram illustrating some operation stages of an electronic device according to various embodiments of the present disclosure.

FIG. 21 is a diagram illustrating some operation stages of an electronic device according to various embodiments of the present disclosure.

Referring to FIGS. 20 and 21, the electronic device 100 according to various embodiments of the present disclosure may include the second cover part 122 provided with a first magnetic element 183 and a first outer connection member 182 provided with a second magnetic element 184. The second magnetic element 184 may be provided at a position to be in contact with the first magnetic element 183, when the first display unit 111 is rotated in a direction toward the second display unit 112. The shape-preserving member 181 may be provided below the second magnetic element 184 and may extend from the position of the second magnetic element 184 toward the first display unit 111.

In various embodiments of the present disclosure, the first magnetic element 183 and the second magnetic element 184 may be provided in the second cover part 122 and the connection unit 180, respectively, and as long as the first magnetic element 183 and the second magnetic element 184 can be in contact with each other when the first cover part 121 is rotated toward the second cover part 122, positions of the first magnetic element 183 and the second magnetic element 184 can be changed in various ways.

Referring to FIG. 21, in the electronic device 100 according to various embodiments of the present disclosure, the second magnetic element 184 may be attached to the first magnetic element 183 near a position where the first cover part 121 is attached to a top surface of the second cover part 122. In some embodiments of the present disclosure, each of the first and second magnetic elements 183 and 184 may be provided to include a magnet. However, in certain embodiments of the present disclosure, one of the first and second magnetic elements 183 and 184 may be formed of a magnet and the other may be formed of a metallic material (e.g., iron), to which an attractive force from a magnet can be exerted.

In the case where the first cover part 121 is rotated in a direction away from the second cover part 122, the first magnetic element 183 and the second magnetic element 184 may still be in a contacted state, until the angle between the first cover part 121 and the second cover part 122 reaches 90°.

In various embodiments of the present disclosure, since the connection unit 180 includes the shape-preserving member 181 provided below the second magnetic element 184, a position of the first cover part 121 can be maintained in a stationary manner at a user's desired position. Accordingly, it is possible to maintain an angle between the first display unit 111 and the second display unit 112, which are respectively provided on the first cover part 121 and the second cover part 122, at a certain angle.

In the case where the angle between the first cover part 121 and the second cover part 122 is increased above 90° by an external force, the first magnetic element 183 may be detached from the second magnetic element 184, and thus, the first cover part 121 may be rotated by a gravitational force or an external force exerted by a user, without any constraint from the second cover part 122.

In other words, according to the fifth embodiment of the present disclosure, in the case where the angle between the first cover part 121 and the second cover part 122 ranges from 0° to 90°, it is possible to maintain the angle between the first cover part 121 and the second cover part 122 at a certain angle using the shape-preserving member 181 and the magnetic elements, and in the case where the angle between the first cover part 121 and the second cover part 122 is greater than 90°, the first magnetic element 183 and the second magnetic element 184 may be separated from each other and thus the position of the first cover part 121 may not be constrained any more by the second cover part 122.

Sixth Embodiment

Figure 22:
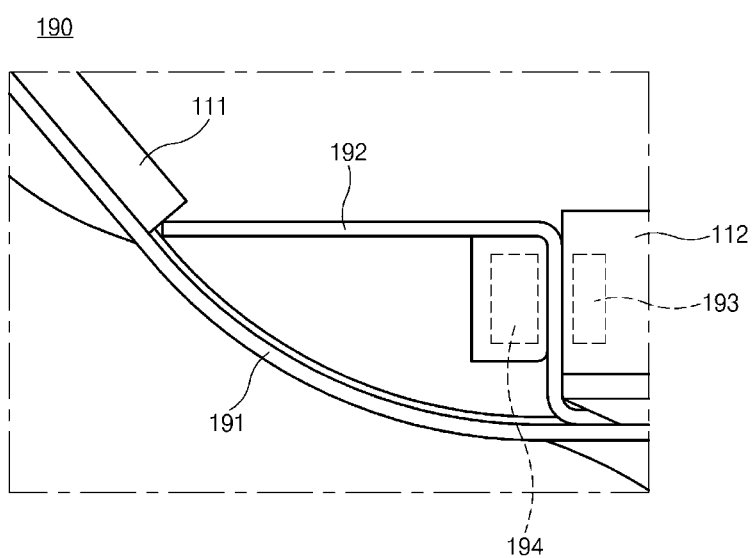
FIG. 22 is a sectional view of an electronic device according to various embodiments of the present disclosure.

FIG. 22 is a sectional view of an electronic device according to various embodiments of the present disclosure.

Referring to FIG. 22, an electronic device according to various embodiments of the present disclosure may include a display unit, a cover unit, and a connection unit 190. The display unit may include the first display unit 111 and the second display unit 112 spaced apart from each other. The cover unit may include the first cover part 121, to which the first display unit 111 is attached, and the second cover part 122, to which the second display unit 112 is attached. The second cover part 122 may be provided to include a third magnetic element 193. The connection unit 190 may be provided to connect the first cover part 121 to the second cover part 122. For example, the connection unit 190 may include a second outer connection member 191 and a second inner connection member 192, each of which is provided to connect the first cover part 121 to the second cover part 122. The second inner connection member 192 may be provided on the second outer connection member 191 and may be longer than the second outer connection member 191. The second inner connection member 192 may include a fourth magnetic element 194, which is provided to be located at a position corresponding to the third magnetic element 193, when the first cover part 121 is rotated toward the second cover part 122.

In various embodiments of the present disclosure, the display unit 110 and the cover unit 120 may be configured to have substantially the same features as those of the first embodiment of the present disclosure, and thus, a description thereof is omitted to avoid redundancy.

The sixth embodiment of the present disclosure may differ from the first to fifth embodiment of the present disclosure, in that the connection unit 190 includes the third magnetic element 193 and the fourth magnetic element 194, but not the shape-preserving member. In various embodiments of the present disclosure, the third magnetic element 193 may be provided adjacent to a side of the second cover part 122, and the second magnetic element may be provided adjacent to a side of the second inner connection member 192.

According to various embodiments of the present disclosure, the second outer connection member 191 may be configured to connect the first cover part 121 to the second cover part 122 and may be configured to have substantially the same features as the first outer connection member 191 previously described in the first embodiment of the present disclosure.

Accordingly, in the electronic device according to various embodiments of the present disclosure, when the first cover part 121 spaced apart from the second cover part 122 is rotated toward the second cover part 122, the fourth magnetic element 194 may be attached to the third magnetic element 193. Furthermore, since the second inner connection member 192 provided with the fourth magnetic element 194 exerts an attractive force to the first cover part 121, it is possible to maintain an angle between the first cover part 121 and the second cover part 122 at a certain angle, even when an external force vanished.

Seventh Embodiment

Figure 23:
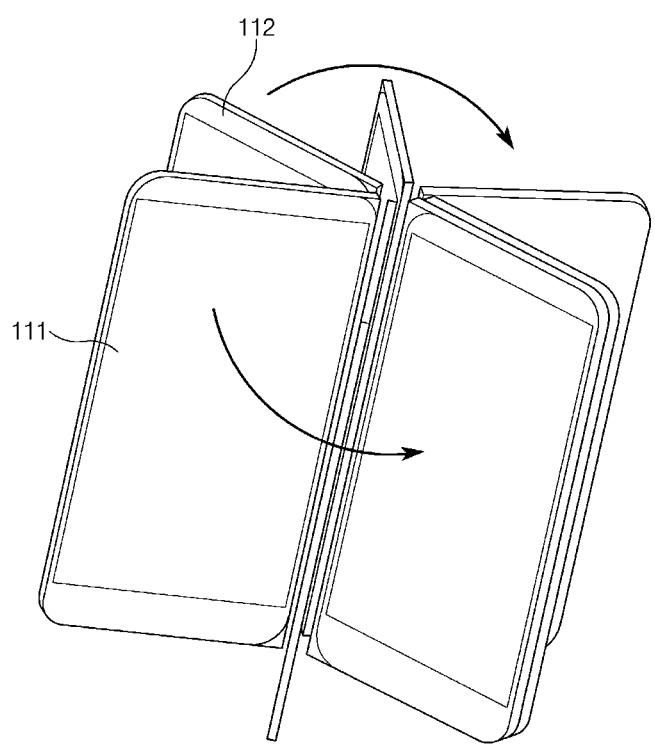
FIG. 23 is a perspective view of an electronic device according to various embodiments of the present disclosure.

FIG. 23 is a perspective view of an electronic device according to various embodiments of the present disclosure.

Figure 24:
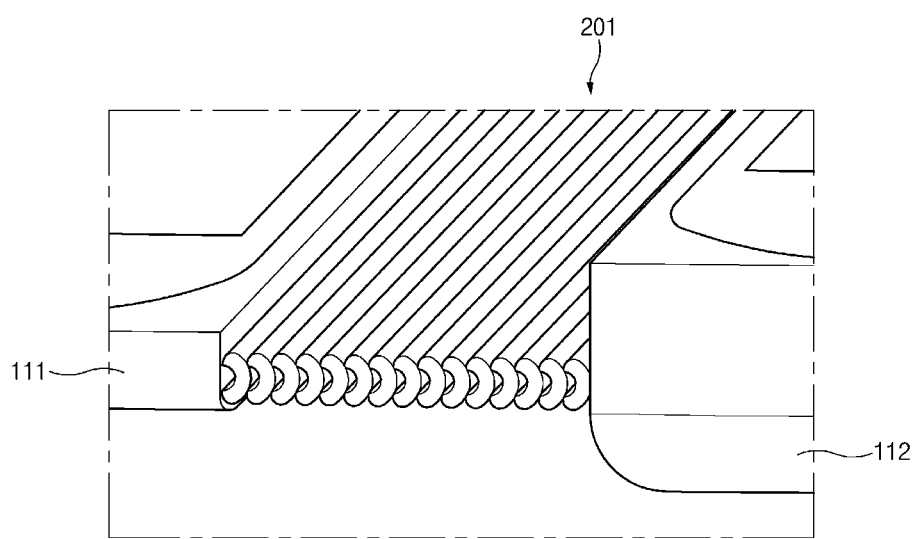
FIG. 24 is an enlarged view illustrating a portion of an electronic device according to various embodiments of the present disclosure.

FIG. 24 is an enlarged view illustrating a portion of an electronic device according to various embodiments of the present disclosure.

Figure 25:
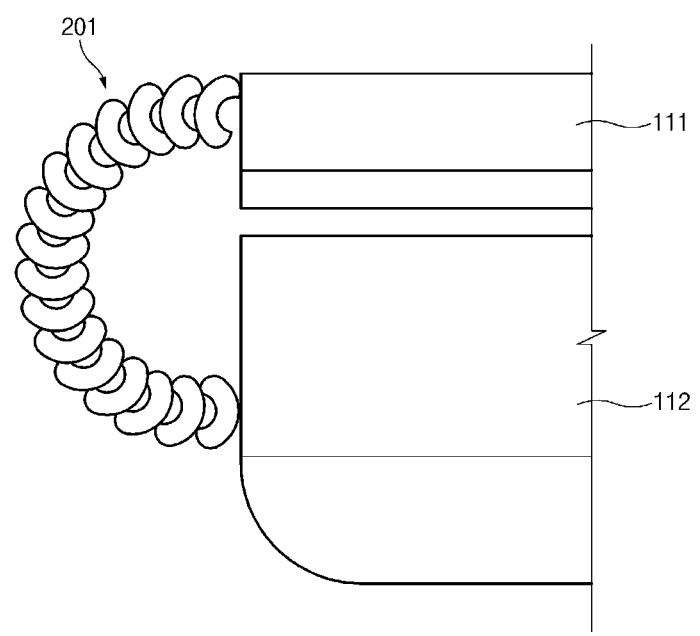
FIG. 25 is a front view illustrating a display unit of an electronic device in a folded state, according to various embodiments of the present disclosure.

FIG. 25 is a front view illustrating a display unit of an electronic device in a folded state, according to various embodiments of the present disclosure.

Figure 26A:
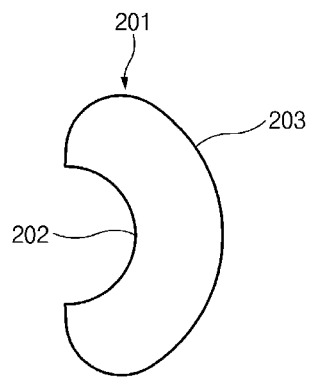
FIGS. 26A and 26B are sectional and perspective views of a connection member according to various embodiments of the present disclosure.
Figure 26B:
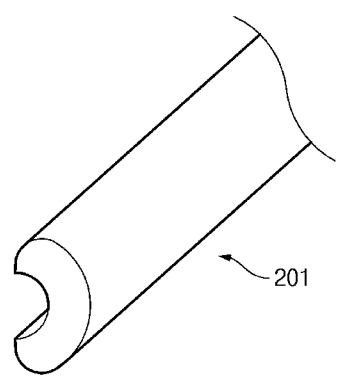

FIGS. 26A and 26B are sectional and perspective views of a connection member according to various embodiments of the present disclosure.

Referring to FIGS. 23, 24, 25, 26A, and 26B, the electronic device 100 according to various embodiments of the present disclosure may include a display unit, a cover unit, and a connection unit 200. The display unit may include the first display unit 111 and the first display unit 111 spaced apart from each other. Cover unit may include the first cover part 121, to which the first display unit 111 is attached, and the second cover part 122, to which the second display unit 112 is attached. The connection unit 200 may include a plurality of fifth connection members 201, which are coupled to each other, and two opposite ones of which are respectively connected to the first cover part 121 and the second cover part 122.

In various embodiments of the present disclosure, the display unit 110 and the cover unit 120 may be configured to have substantially the same features as those of the first embodiment of the present disclosure, and thus, a description thereof is omitted to avoid redundancy.

Referring to FIGS. 24, 25, 26A, and 26B, in various embodiments of the present disclosure, each of the fifth connection members 201 may be shaped like a rod with a semicircular section and may have an inwardly concave surface 202 and an outwardly convex surface 203, which are opposite to each other. The fifth connection member 201 may be provided to have a length smaller than or equivalent to those of the first cover part 121 and the second cover part 122. In addition, the fifth connection member 201 may be formed of at least one of metallic or plastic materials.

In various embodiments of the present disclosure, since the connection unit 200 is a single component including the plurality of the fifth connection members 201, whose side surfaces are coupled to each other, the connection unit 200 may be bent at positions between the plurality of the fifth connection members 201, when an external force is exerted on the connection unit 200.

In the case where an external force is exerted on the first cover part 121 or the second cover part 122 to rotate the first cover part 121 in a direction toward or away the second cover part 122, the connection unit 200 may be bent to have a 'C'-shaped structure as shown in FIG. 25, because the connection unit 200 has opposite ends that are respectively attached to the first cover part 121 and the second cover part 122.

In addition, the connection unit 200 may be variously bent, depending on a direction of an external force. As an example, the connection unit 200 may be bent to have an 'S'-shaped structure. This may make it possible to variously change an angle between the first display unit 111 and the second display unit 112, which are attached to the first cover part 121 and the second display unit 112, respectively.

Furthermore, the connection unit 200 may be formed to have a hole, in which the circuit board P connecting the first display unit 111 to the second display unit 112 can be inserted.

According to various embodiments of the present disclosure, it is possible to maintain an angle between two display units at a certain angle, without the use of any hinge.

Figure 27:
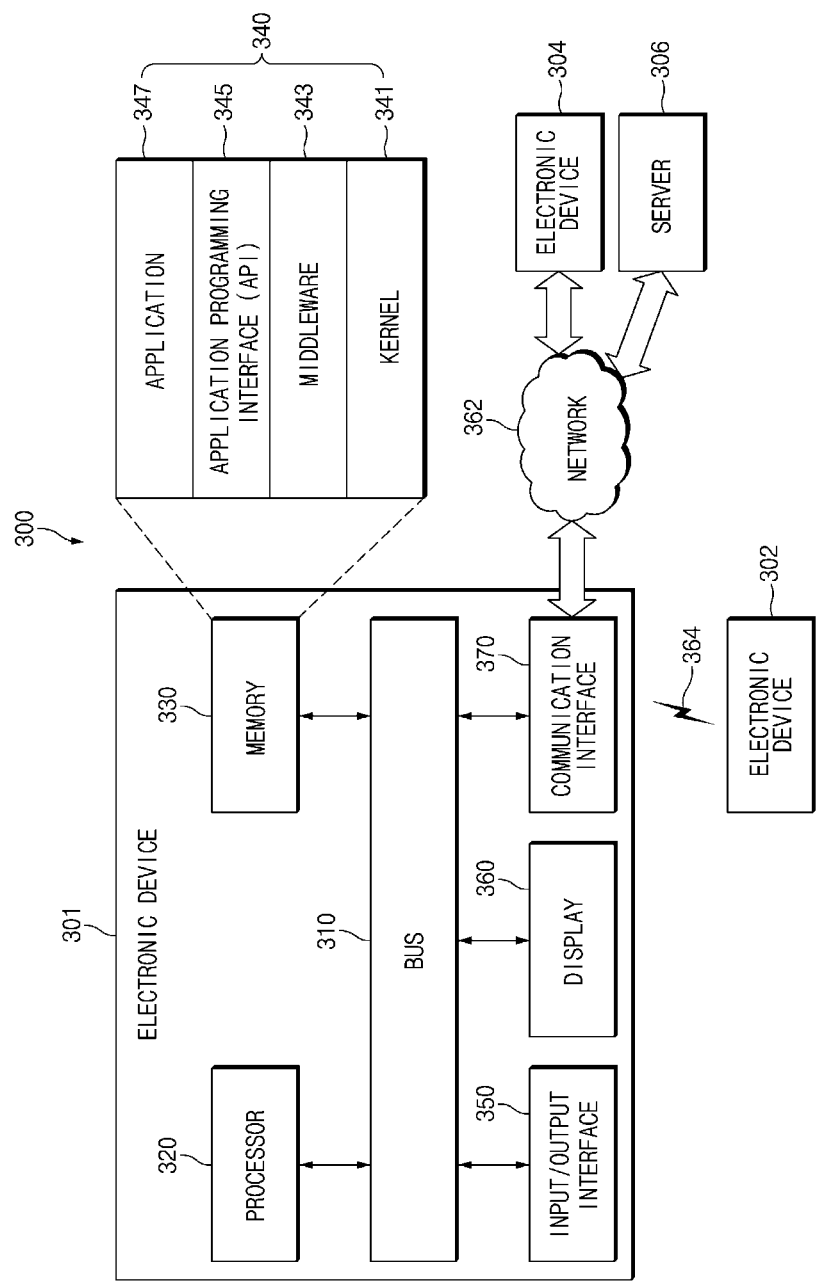
FIG. 27 is a diagram illustrating an electronic device in a network environment according to various embodiments of the present disclosure.

FIG. 27 is a diagram illustrating an electronic device in a network environment according to various embodiments of the present disclosure.

Referring to FIG. 27, there is illustrated an electronic device 301 in a network environment 300 according to various embodiments of the present disclosure. The electronic device 301 may include a bus 310, a processor 320, a memory 330, an input/output (I/O) interface 350, a display 360, and a communication interface 370. According to an embodiment of the present disclosure, the electronic device 301 may not include at least one of the above-described components or may further include other component(s).

The bus 310 may interconnect the above-described components 310 to 370 and may be a circuit for conveying communications (e.g., a control message and/or data) among the above-described components.

The processor 320 may include one or more of a CPU, an AP, or a communication processor (CP). The processor 320 may perform, for example, data processing or an operation associated with control or communication of at least one other component(s) of the electronic device 301.

The memory 330 may include a volatile and/or nonvolatile memory. The memory 330 may store instructions or data associated with at least one other component(s) of the electronic device 301. According to various embodiments of the present disclosure, the memory 330 may store software and/or a program 340. The program 340 may include, for example, a kernel 341, a middleware 343, an application programming interface (API) 345, and/or an application (or an application program) 347. At least a portion of the kernel 341, the middleware 343, or the API 345 may be called an "operating system (OS)".

The kernel 341 may control or manage system resources (e.g., the bus 310, the processor 320, the memory 330, and the like) that are used to execute operations or functions of other programs (e.g., the middleware 343, the API 345, and the application program 347). Furthermore, the kernel 341 may provide an interface that allows the middleware 343, the API 345, or the application program 347 to access discrete components of the electronic device 301 so as to control or manage system resources. The middleware 343 may perform a mediation role such that the API 345 or the application program 347 communicates with the kernel 341 to exchange data.

Furthermore, the middleware 343 may process task requests received from the application program 347 according to a priority. For example, the middleware 343 may assign the priority, which makes it possible to use a system resource (e.g., the bus 310, the processor 320, the memory 330, and the like) of the electronic device 301, to at least one of the application program 347. For example, the middleware 343 may process the one or more task requests according to the priority assigned to the at least one, which makes it possible to perform scheduling or load balancing on the one or more task requests.

The API 345 may be an interface through which the application program 347 controls a function provided by the kernel 341 or the middleware 343, and may include, for example, at least one interface or function (e.g., an instruction) for a file control, a window control, image processing, a character control, and the like.

The I/O interface 350 may transmit an instruction or data, input from a user or another external device, to other component(s) of the electronic device 301. Furthermore, the I/O interface 350 may output an instruction or data, received from other component(s) of the electronic device 301, to a user or another external device.

The display 360 may include, for example, a liquid crystal display (LCD), an LED display, an organic LED (OLED) display, or a microelectromechanical systems (MEMS) display, or an electronic paper display. The display 360 may display, for example, various contents (e.g., a text, an image, a video, an icon, a symbol, and the like) to a user. The display 360 may include a touch screen and may receive, for example, a touch, gesture, proximity, or hovering input using an electronic pen or a portion of a user's body.

The communication interface 370 may establish communication between the electronic device 301 and an external electronic device (e.g., a first external electronic device 302, a second external electronic device 304, or a server 306). For example, the communication interface 370 may be connected to a network 362 through wireless communication or wired communication to communicate with the external device (e.g., the second external electronic device 304 or a server 306).

The wireless communication may include at least one of, for example, long term evolution (LTE), LTE-advanced (LTE-A), code division multiple access (CDMA), wideband CDMA (WCDMA), universal mobile telecommunications system (UMTs), wireless broadband (WiBro), global system for mobile communications (GSM), and the like, as cellular communication protocol. The wired communication may include at least one of, for example, a universal serial bus (USB), a high definition multimedia interface (HDMI), a recommended standard-332 (RS-332), or a plain old telephone service (POTS). The network 362 may include at least one of telecommunications networks, for example, a computer network (e.g., local area network (LAN) or wide area network (WAN)), an internet, or a telephone network.

Each of the first external electronic device 302 and the second external electronic device 304 may be a device of which the type is different from or the same as that of the electronic device 301. According to an embodiment of the present disclosure, the server 306 may include a group of one or more servers. According to various embodiments of the present disclosure, all or a part of operations that the electronic device 301 will perform may be executed by another or plural electronic devices (e.g., the first external electronic device 302 and the second external electronic device 304 and the server 306). According to an embodiment of the present disclosure, in the case where the electronic device 301 executes any function or service automatically or in response to a request, the electronic device 301 may not perform the function or the service internally. However, alternatively additionally, the electronic device 301 may request at least a portion of a function associated with the electronic device 301 at other device (e.g., the first external electronic device 302 or the second external electronic device 304 or the server 306). The other electronic device (e.g., the first external electronic device 302 or the second external electronic device 304 or the server 306) may execute the requested function or additional function and may transmit the execution result to the electronic device 301. The electronic device 301 may provide the requested function or service using the received result or may additionally process the received result to provide the requested function or service. To this end, for example, cloud computing, distributed computing, or client-server computing may be used.

Figure 28:
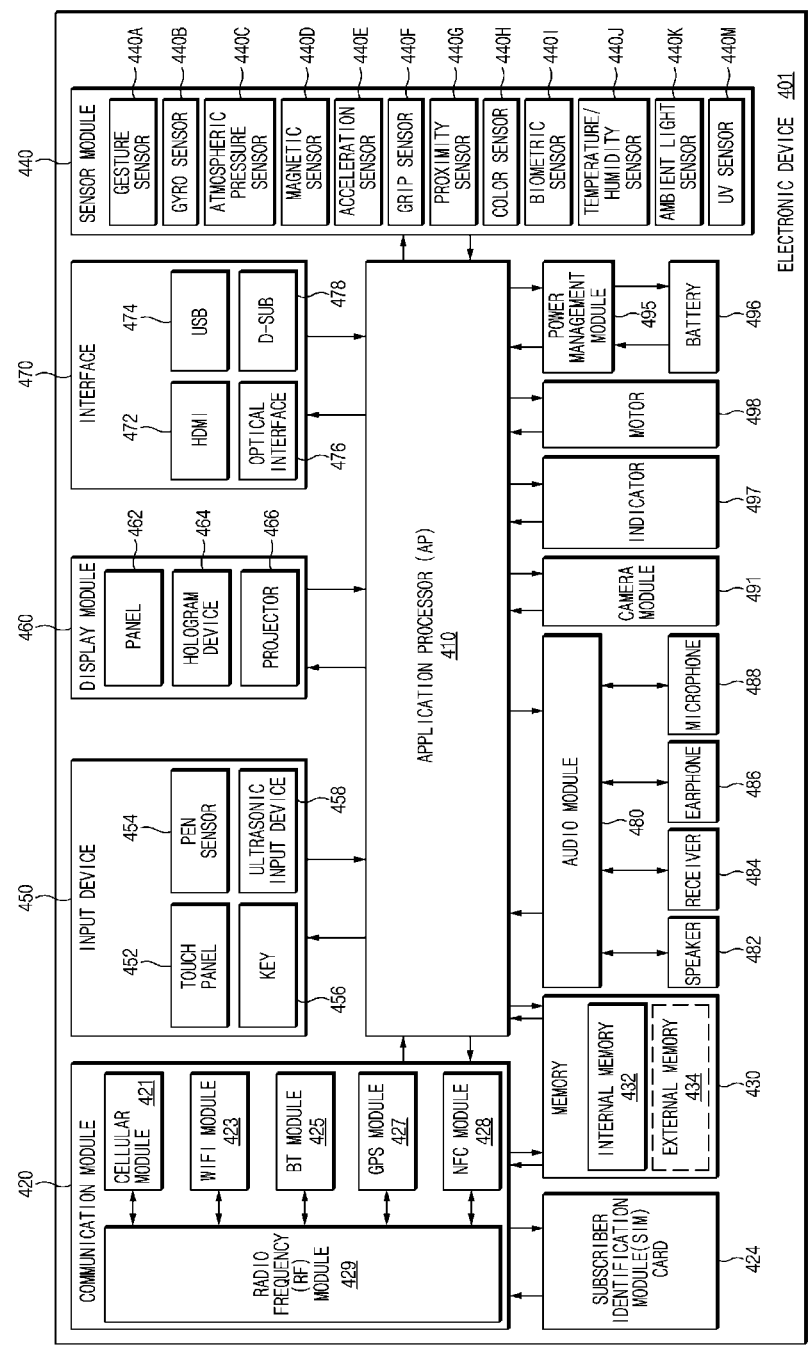
FIG. 28 is a block diagram illustrating an electronic device according to various embodiments of the present disclosure.

FIG. 28 is a block diagram illustrating an electronic device according to various embodiments of the present disclosure.

Referring to FIG. 28, an electronic device 401 may include, for example, all or a part of an electronic device 301 illustrated in FIG. 27. The electronic device 401 may include one or more processors (e.g., an AP, a graphics processor, and the like) 410, a communication module 420, a subscriber identification module (SIM) card 424, a memory 430, a sensor module 440, an input device 450, a display 460 (e.g., the display 360), an interface 470, an audio module 480, a camera module 491, a power management module 495, a battery 496, an indicator 497, and a motor 498.

The processor 410 may drive an OS or an application to control a plurality of hardware or software components connected to the processor 410 and may process and compute a variety of data. The processor 410 may be implemented with a system on chip (SoC), for example. According to an embodiment of the present disclosure, the processor 410 may further include a graphics processing unit (GPU) and/or an image signal processor (ISP). The processor 410 may include at least a part (e.g., a cellular module 421) of components illustrated in FIG. 28. The processor 410 may load and process an instruction or data, which is received from at least one of other components (e.g., a nonvolatile memory), and may store a variety of data at a nonvolatile memory.

The communication module 420 may be configured the same as or similar to a communication interface 370 of FIG. 27. The communication module 420 may include a cellular module 421, a Wi-Fi module 423, a Bluetooth (BT) module 425, a GPS module 427, an NFC module 428, and a radio frequency (RF) module 429.

The cellular module 421 may provide voice communication, video communication, a character service, an Internet service, and the like, through a communication network. According to an embodiment of the present disclosure, the cellular module 421 may perform discrimination and authentication of an electronic device 401 within a communication network using the SIM card 424, for example. According to an embodiment of the present disclosure, the cellular module 421 may perform at least a portion of functions that the processor 410 provides. According to an embodiment of the present disclosure, the cellular module 421 may include a CP.

Each of the Wi-Fi module 423, the BT module 425, the GPS module 427, and the NFC module 428 may include a processor for processing data exchanged through a corresponding module, for example. According to an embodiment of the present disclosure, at least a portion (e.g., two or more components) of the cellular module 421, the Wi-Fi module 423, the BT module 425, the GPS module 427, and the NFC module 428 may be included within one integrated circuit (IC) or an IC package.

The RF module 429 may transmit and receive a communication signal (e.g., an RF signal). The RF module 429 may include a transceiver, a power amplifier module (PAM), a frequency filter, a low noise amplifier (LNA), an antenna, and the like. According to various embodiments of the present disclosure, at least one of the cellular module 421, the Wi-Fi module 423, the BT module 425, the GPS module 427, or the NFC module 428 may transmit and receive an RF signal through a separate RF module.

The SIM card 424 may include, for example, a card and/or an embedded SIM which includes a SIM and may include unique identify information (e.g., IC card identifier (IC-CID)) or subscriber information (e.g., integrated mobile subscriber identity (IMSI)).

The memory 430 (e.g., a memory 330) may include an internal memory 432 or an external memory 434. For example, the internal memory 432 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 434 may include a flash drive, for example, compact flash (CF), secure digital (SD), micro-SD, mini-SD, extreme digital (xD), multimedia card (MMC), a memory stick, and the like. The external memory 434 may be functionally and/or physically connected to the electronic device 401 through various interfaces.

The sensor module 440 may measure, for example, a physical quantity or may detect an operation state of the electronic device 401. The sensor module 440 may convert the measured or detected information to an electric signal. The sensor module 440 may include at least one of a gesture sensor 440A, a gyro sensor 440B, a pressure sensor 440C, a magnetic sensor 440D, an acceleration sensor 440E, a grip sensor 440F, a proximity sensor 440G, a color sensor 440H (e.g., red, green, blue (RGB) sensor), a living body sensor 440I, a temperature/humidity sensor 440J, an illuminance sensor 440K, or an ultraviolet (UV) sensor 440M. Although not illustrated, additionally or generally, the sensor module 440 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 440 may further include a control circuit for controlling at least one or more sensors included therein. According to an embodiment of the present disclosure, the electronic device 401 may further include a processor which is a part of the processor 410 or independent of the processor 410 and is configured to control the sensor module 440. The processor may control the sensor module 440 while the processor 410 remains at a sleep state.

The input device 450 may include, for example, a touch panel 452, a (digital) pen sensor 454, a key 456, or an ultrasonic input unit 458. The touch panel 452 may use at least one of capacitive, resistive, infrared and ultrasonic detecting methods. In addition, the touch panel 452 may further include a control circuit. The touch panel 452 may further include a tactile layer to provide a tactile reaction to a user.

The (digital) pen sensor 454 may be, for example, a part of a touch panel or may include an additional sheet for recognition. The key 456 may include, for example, a physical button, an optical key, a keypad, and the like. The ultrasonic input device 458 may detect (or sense) an ultrasonic signal, which is generated from an input device, through a microphone (e.g., a microphone 488) and may determine data corresponding to the detected ultrasonic signal.

The display 460 (e.g., a display 360) may include a panel 462, a hologram device 464, or a projector 466. The panel 462 may be configured the same as or similar to a display 360 of FIG. 27. The panel 462 and the touch panel 452 may be integrated into a single module. The hologram device 464 may display a stereoscopic image in a space using a light interference phenomenon. The projector 466 may project light onto a screen so as to display an image. The screen may be arranged in the inside or the outside of the electronic device 401. According to an embodiment of the present disclosure, the display 460 may further include a control circuit for controlling the panel 462, the hologram device 464, or the projector 466.

The interface 470 may include, for example, an HDMI 472, a USB 474, an optical interface 476, or a D-subminiature (D-sub) 478. The interface 470 may be included, for example, in a communication interface 370 illustrated in FIG. 27. Additionally or generally, the interface 470 may include, for example, a mobile high definition link (MHL) interface, a SD card/multi-media card (MMC) interface, or an infrared data association (IrDA) standard interface.

The audio module 480 may convert a sound and an electric signal in dual directions. At least a portion of the audio module 480 may be included, for example, in an I/O interface 350 illustrated in FIG. 27. The audio module 480 may process, for example, sound information that is input or output through a speaker 482, a receiver 484, an earphone 486, or a microphone 488.

The camera module 491 for shooting a still image or a video may include, for example, at least one image sensor (e.g., a front sensor or a rear sensor), a lens, an ISP, or a flash (e.g., an LED or a xenon lamp).

The power management module 495 may manage, for example, power of the electronic device 401. According to an embodiment of the present disclosure, a power management IC (PMIC) a charger IC, or a battery or fuel gauge may be included in the power management module 495. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 496 and a voltage, current or temperature thereof while the battery is charged. The battery 496 may include, for example, a rechargeable battery or a solar battery.

The indicator 497 may display a specific state of the electronic device 401 or a portion thereof (e.g., a processor 410), such as a booting state, a message state, a charging state, and the like. The motor 498 may convert an electrical signal into a mechanical vibration and may generate the following effects: vibration, haptic, and the like. Although not illustrated, a processing device (e.g., a GPU) for supporting a mobile TV may be included in the electronic device 401. The processing device for supporting a mobile TV may process media data according to the standards of digital media broadcasting (DMB), digital video broadcasting (DVB), MediaFlo™, and the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 29:
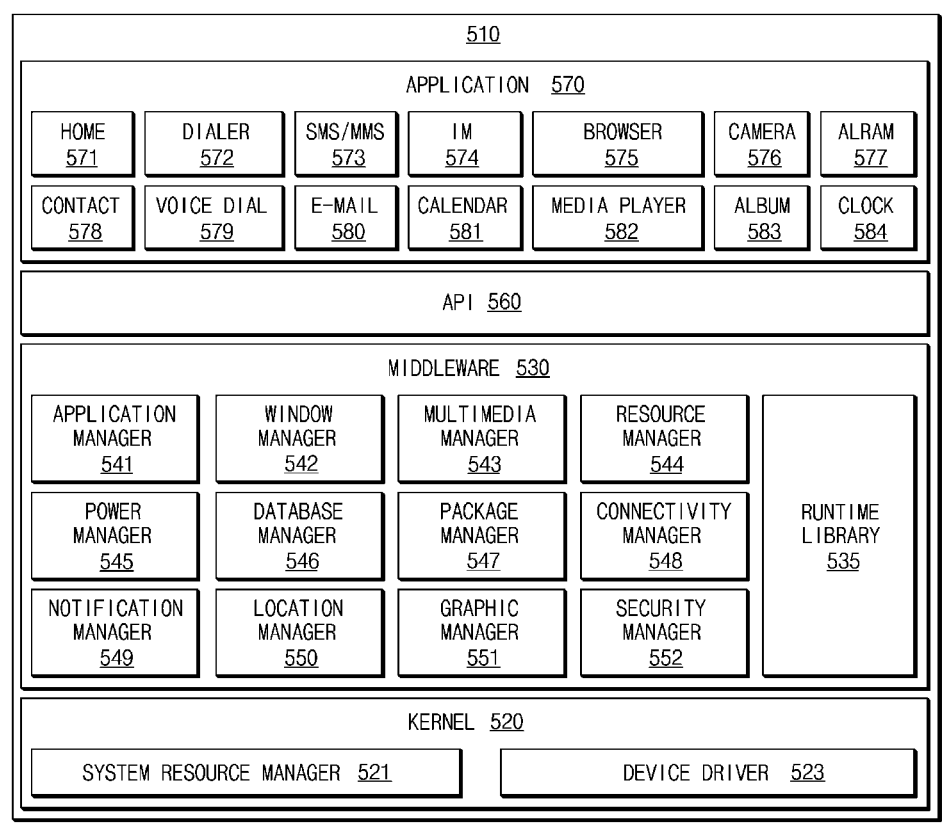
FIG. 29 illustrates a block diagram of a program module according to various embodiments of the present disclosure.

FIG. 29 illustrates a block diagram of a program module according to various embodiments of the present disclosure.

Referring to FIG. 29, according to an embodiment of the present disclosure, a program module 510 (e.g., a program 340) may include an OS to control resources associated with an electronic device (e.g., an electronic device 301), and/or diverse applications (e.g., an application program 347) driven on the OS. The OS may be, for example, android, iOS, windows, symbian, tizen, or bada.

The program module 510 may include a kernel 520, a middleware 530, an API 560, and/or an application 570. At least a part of the program module 510 may be preloaded on an electronic device or may be downloadable from an external electronic device (e.g., the first external electronic device 302 or the second external electronic device 304, a server 306, and the like).

The kernel 520 (e.g., a kernel 341) may include, for example, a system resource manager 521 or a device driver 523. The system resource manager 521 may perform control, allocation, or retrieval of system resources. According to an embodiment of the present disclosure, the system resource manager 521 may include a process managing part, a memory managing part, or a file system managing part. The device driver 523 may include, for example, a display driver, a camera driver, a Bluetooth driver, a common memory driver, a USB driver, a keypad driver, a Wi-Fi driver, an audio driver, or an inter-process communication (IPC) driver.

The middleware 530 may provide, for example, a function which the application 570 needs in common, or may provide diverse functions to the application 570 through the API 560 to allow the application 570 to efficiently use limited system resources of the electronic device. According to an embodiment of the present disclosure, the middleware 530 (e.g., a middleware 343) may include at least one of a runtime library 535, an application manager 541, a window manager 542, a multimedia manager 543, a resource manager 544, a power manager 545, a database manager 546, a package manager 547, a connectivity manager 548, a notification manager 549, a location manager 550, a graphic manager 551, or a security manager 552.

The runtime library 535 may include, for example, a library module which is used by a compiler to add a new function through a programming language while the application 570 is being executed. The runtime library 535 may perform I/O management, memory management, or capacities about arithmetic functions.

The application manager 541 may manage, for example, a life cycle of at least one application of the application 570. The window manager 542 may manage a graphical user interface (GUI) resource which is used in a screen. The multimedia manager 543 may identify a format necessary for playing diverse media files, and may perform encoding or decoding of media files by using a codec suitable for the format. The resource manager 544 may manage resources, such as a storage space, memory, or source code of at least one application of the application 570.

The power manager 545 may operate, for example, with a basic I/O system (BIOS) to manage a battery or power, and may provide power information for an operation of an electronic device. The database manager 546 may generate, search for, or modify database which is to be used in at least one application of the application 570. The package manager 547 may install or update an application which is distributed in the form of package file.

The connectivity manager 548 may manage, for example, wireless connection, such as Wi-Fi or Bluetooth. The notification manager 549 may display or notify an event, such as arrival message, promise, or proximity notification in a mode that does not disturb a user. The location manager 550 may manage location information of an electronic device. The graphic manager 551 may manage a graphic effect that is provided to a user, or manage a user interface relevant thereto. The security manager 552 may provide a general security function necessary for system security or user authentication. According to an embodiment of the present disclosure, in the case where an electronic device (e.g., an electronic device 301) includes a telephony function, the middleware 530 may further includes a telephony manager for managing a voice or video call function of the electronic device.

The middleware 530 may include a middleware module that combines diverse functions of the above-described components. The middleware 530 may provide a module specialized to each OS kind to provide differentiated functions. Additionally, the middleware 530 may remove a part of the preexisting components, dynamically, or may add a new component thereto.

The API 560 (e.g., an API 345) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 570 (e.g., an application program 347) may include, for example, one or more applications capable of providing functions for a home 571, a dialer 572, a short message service (SMS)/multimedia message service (MMS) 573, an instant message (IM) 574, a browser 575, a camera 576, an alarm 577, a contact 578, a voice dial 579, an e-mail 580, a calendar 581, a media player 582, am album 583, and a clock 584, or for offering health care (e.g., measuring an exercise quantity or blood sugar) or environment information (e.g., atmospheric pressure, humidity, or temperature).

According to an embodiment of the present disclosure, the application 570 may include an application (hereinafter referred to as "information exchanging application" for descriptive convenience) to support information exchange between the electronic device (e.g., an electronic device 301) and an external electronic device (e.g., the first external electronic device 302 or the second external electronic device 304). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., the first external electronic device 302 or the second external electronic device 304). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the first external electronic device 302 or the second external electronic device 304) which communicates with the electronic device, an application running in the external electronic device, or a service (e.g., a call service or a message service) provided from the external electronic device.

According to an embodiment of the present disclosure, the application 570 may include an application (e.g., a health care application) which is assigned in accordance with an attribute (e.g., an attribute of a mobile medical device as a kind of electronic device) of the external electronic device (e.g., the first external electronic device 302 or the second external electronic device 304). According to an embodiment of the present disclosure, the application 570 may include an application which is received from an external electronic device (e.g., a server 306 or the first external electronic device 302 or the second external electronic device 304). According to an embodiment of the present disclosure, the application 570 may include a preloaded application or a third party application which is downloadable from a server. The component titles of the program module 510 according to the embodiment of the present disclosure may be modifiable depending on kinds of OSs.

According to various embodiments of the present disclosure, at least a portion of the program module 510 may be implemented by software, firmware, hardware, or a combination of two or more thereof. At least a portion of the program module 510 may be implemented (e.g., executed), for example, by a processor (e.g., a processor 210). At least a portion of the program module 510 may include, for example, modules, programs, routines, sets of instructions, or processes, and the like, for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments of the present disclosure may be, for example, implemented by instructions stored in a computer-readable storage media in the form of a program module. The instruction, when executed by one or more processors (e.g., a processor 320), may cause the one or more processors to perform a function corresponding to the instruction. The computer-readable storage media, for example, may be the memory 330.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. In addition, a portion of operations may be executed in different sequences, omitted, or other operations may be added.

According to various embodiments of the present disclosure, it is possible to maintain an angle between two display units at a certain angle, without the use of any hinge.

According to various embodiments of the present disclosure, it is possible to connect a first display unit to a second display unit, without the use of any hinge, and the absence of the hinge makes it possible to reduce a thickness of an electronic device, when the electronic device is folded.

According to various embodiments of the present disclosure, since two display units of an electronic device can be connected to each other without the use of any hinge, it is possible to design an electronic device, without any limitation resulting from the presence of the hinge.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a display including a first display and a functional device spaced apart from each other, the functional device being equipped with an electronic component;
    a cover including a first cover part and a second cover part, to which the first display and the functional device are respectively attached; and
    a connection device including:
        a shape-preserving member, and
        a first connection member covering the shape-preserving member and connecting the first cover part to the second cover part,
    wherein the shape-preserving member is configured to, when an angle between the first cover part and the second cover part is changed by an external force, maintain the changed angle between the first cover part and the second cover part, and
    wherein the first connection member comprises:
        a first outer connection member provided to cover both of the first cover part and the second cover part and thereby to connect the first cover part to the second cover part, and a first inner connection member provided opposite to the first outer connection member to connect the first cover part to the second cover part.

2. The electronic device of claim 1, wherein the shape-preserving member is formed of ethylene homopolymers or ethylene•α-olefin copolymers, whose density is higher than 950 kg/m3, Mw/Mn ranges from 5 to 15, content of α-olefin with a carbon number of 3-6 is less than 2 wt %, where Mw and Mn represent a weight-average molecular weight and a number-average molecular weight, respectively.

3. The electronic device of claim 1, wherein the shape-preserving member is manufactured by:
preparing a circular film containing ethylene homopolymers, whose density is higher than 940 kg/m3 and Mw/Mn ranges from 5 to 20, or ethylene-α-olefin copolymers, whose content of α-olefin with a carbon number of 3-6 is less than 2 wt %, and
stretching or drawing the circular film at a draw ratio of 10-30, where Mw and Mn represent a weight-average molecular weight and a number-average molecular weight, respectively.

4. The electronic device of claim 1,
wherein the shape-preserving member comprises:
at least one substrate layer containing at least one of ethylene polymers, whose density is higher than 900 kg/m3 and Mw/Mn ranges from 5 to 20, and
at least one soft layer containing a polymeric material, where Mw and Mn represent a weight-average molecular weight and a number-average molecular weight, respectively,
wherein the ethylene polymers comprise ethylene homopolymers or ethylene-α-olefin copolymers, whose content of α-olefin with a carbon number of 3-6 is less than 2 wt %, and
wherein the polymeric materials are selected to have a melting point, Tm2, that is lower than a melting point, Tm1, of the ethylene polymer, to have a tensile modulus of 10-50 GPa, and to have a restoration angle of 65° or less under a 180°-bending test.

5. The electronic device of claim 1, further comprising:
a circuit board inserted between the shape-preserving member and the first inner connection member to connect the first display to the functional device.

6. The electronic device of claim 1, wherein the connection device further comprises an insertion member, which is interposed between the outer connection member and the shape-preserving member to allow the first outer connection member to have a sectional shape.

7. The electronic device of claim 1,
wherein the display is configured to allow a battery to be attached or detached thereto or therefrom, and
wherein the cover is configured to be attached or detached to or from the display, thereby allowing for replacement of the battery.

8. The electronic device of claim 1, wherein the connection device comprises:
a second connection member connected to the first cover part, the second connection member having an end portion with a curved or inclined surface;
a third connection member connected to the second cover part, the third connection member having an end portion with a curved or inclined surface; and
a fourth connection member disposed between the second and third connection members, the fourth connection member having opposite end portions, each of which has a curved or inclined surface and is in contact with one of the second and third connection members formed with the curved or inclined surface,
wherein the shape-preserving member is provided in a form of a plate or board and is disposed on top and bottom surfaces of the second to fourth connection members, thereby allowing the second to fourth connection members to be inserted therein.

9. The electronic device of claim 8, wherein the connection device comprises a plurality of the fourth connection members, which are disposed in the shape-preserving member and between the second and third connection members and are in contact with each other.

10. The electronic device of claim 9, wherein each of the end portion of the second connection member, the opposite end portions of the fourth connection member, and the end portion of the third connection member has upward and downward inclined surfaces.

11. The electronic device of claim 10, further comprising:
rotation axes inserted in the second to fourth connection members, respectively; and
at least one joint member connecting adjacent ones of the rotation axes to each other.

12. The electronic device of claim 1,
wherein the connection device comprises:
a second connection member connected to the first cover part,
a third connection member connected to the second cover part, and
a fourth connection member disposed between the second connection member and the third connection member,
wherein each of the second to fourth connection members is provided to include protruding portions, which are arranged in a longitudinal direction thereof and have a laterally protruding shape, and recessed regions, which are formed between the protruding portions,
wherein each of the protruding portions is inserted between an adjacent pair of the recessed regions, and
wherein the shape-preserving member is provided in a form of a plate or board and is disposed on top and bottom surfaces of the second to fourth connection members, thereby allowing the second to fourth connection members to be inserted therein.

13. The electronic device of claim 1,
wherein the connection device comprises:
a second connection member connected to the first cover part,
a third connection member connected to the second cover part, and
a fourth connection member disposed between the second connection member and the third connection member,
wherein the shape-preserving member is provided to have a hole formed at a side thereof in a width direction and is attached to a portion of the fourth connection member, and
wherein the fourth connection member comprises opposite end portions, each of which is provided to be rotatable about a corresponding one of the second and third connection members, and comprises a protrusion inserted in the hole.

14. The electronic device of claim 13, wherein the connection device comprises a plurality of the fourth connection members, adjacent ones of which are coupled to be rotatable about each other.

15. The electronic device of claim 1,
wherein the second cover part comprises a first magnetic element,
wherein the first outer connection member comprises a second magnetic element, which is provided at a position to be in contact with the first magnetic element, when the first display is rotated in a direction toward the functional device, and
wherein the shape-preserving member is provided below the second magnetic element and extends from a position, to which the second magnetic element is attached, toward the first display.

16. The electronic device of claim 1, wherein the functional device comprises at least one of a second display, input devices, sound devices, wireless charging pads, power devices, sensor devices, or antenna devices.

* * * * *